United States Patent
Miller et al.

(10) Patent No.: US 12,424,684 B2
(45) Date of Patent: Sep. 23, 2025

(54) ENERGY STORAGE DEVICE WITH ELECTRICALLY ISOLATED SLEEVE HOUSING CLOSED WITH TWO SEPARATE END CAPS INTEGRATED WITH THE CURRENT TERMINALS

(71) Applicant: Atlas Power Technologies Inc., Abbotsford (CA)

(72) Inventors: Mitchell Miller, Mission (CA); Ali Khosrozadeh, Abbotsford (CA); Behzad Gorji Pour Shafiee, Abbotsford (CA)

(73) Assignee: Atlas Power Technologies Inc., Abbotsford (CA)

( * ) Notice: Subject to any disclaimer, the term of this patent is extended or adjusted under 35 U.S.C. 154(b) by 0 days.

(21) Appl. No.: 19/109,352

(22) PCT Filed: Sep. 6, 2023

(86) PCT No.: PCT/CA2023/051170
§ 371 (c)(1),
(2) Date: Mar. 6, 2025

(87) PCT Pub. No.: WO2024/050625
PCT Pub. Date: Mar. 14, 2024

(65) Prior Publication Data
US 2025/0260095 A1    Aug. 14, 2025

Related U.S. Application Data

(60) Provisional application No. 63/404,491, filed on Sep. 7, 2022.

(51) Int. Cl.
*H01M 50/107* (2021.01)
*H01G 11/78* (2013.01)
(Continued)

(52) U.S. Cl.
CPC .......... *H01M 50/107* (2021.01); *H01G 11/78* (2013.01); *H01G 11/84* (2013.01);
(Continued)

(58) Field of Classification Search
CPC .................................................... H01M 50/548
See application file for complete search history.

(56) References Cited

U.S. PATENT DOCUMENTS 11,038,197 B2    6/2021    Xu
2001/0051297 A1 *  12/2001    Nemoto .............. H01M 50/586
                                                                429/129
(Continued)

FOREIGN PATENT DOCUMENTS

EP        1139458 A2 *  10/2001  .......... H01M 50/325
KR      20130085565          7/2013
(Continued)

OTHER PUBLICATIONS

KR20130085565A_Description (Year: 2013).*

*Primary Examiner* — Brian R Ohara
(74) *Attorney, Agent, or Firm* — Damien G. Loveland; Valuetech Patent Agency Inc

(57) ABSTRACT

The present invention relates to energy storage devices and more particularly to their design and manufacturing method. The energy storage device comprises an electrically isolated cylindrical sleeve housing open at both ends and closed with two separate end caps integrated with the current terminals with an improved design. The upper and lower end caps are integrated with the anode and cathode terminals, and the cylindrical sleeve housing is electrically isolated from both upper and lower end caps integrated with the current collector terminals. Unlike previously known solutions the cylindrical sleeve housing is electrically isolated both from the upper and lower current terminals which are integrated directly into the end caps wherein this is to avoid undesirable (Continued)

side reactions and the disruption of energy storage mechanism. Additionally, the upper and lower end caps are directly integrated with the current terminals and offer an improved design.

12 Claims, 13 Drawing Sheets

(51) Int. Cl.
*H01G 11/84* (2013.01)
*H01M 10/0587* (2010.01)
*H01M 50/152* (2021.01)
*H01M 50/167* (2021.01)
*H01M 50/179* (2021.01)
*H01M 50/548* (2021.01)
*H01M 50/566* (2021.01)
*H01M 50/586* (2021.01)
*H01M 50/59* (2021.01)
*H01M 50/636* (2021.01)

(52) U.S. Cl.
CPC ..... *H01M 10/0587* (2013.01); *H01M 50/152* (2021.01); *H01M 50/167* (2021.01); *H01M 50/179* (2021.01); *H01M 50/548* (2021.01); *H01M 50/566* (2021.01); *H01M 50/586* (2021.01); *H01M 50/59* (2021.01); *H01M 50/636* (2021.01)

(56) References Cited

U.S. PATENT DOCUMENTS

| | | |
|---|---|---|
| 2009/0180238 A1 | 7/2009 | Gallay |
| 2013/0286542 A1 | 10/2013 | Madiberk |
| 2014/0293510 A1 | 10/2014 | Miura et al. |

FOREIGN PATENT DOCUMENTS

| | | | |
|---|---|---|---|
| WO | 2003041097 | 5/2003 | |
| WO | 2017203040 | 11/2017 | |
| WO | WO-2018165585 A2 * | 9/2018 | .......... H01M 10/052 |
| WO | 2020096973 | 5/2020 | |

\* cited by examiner

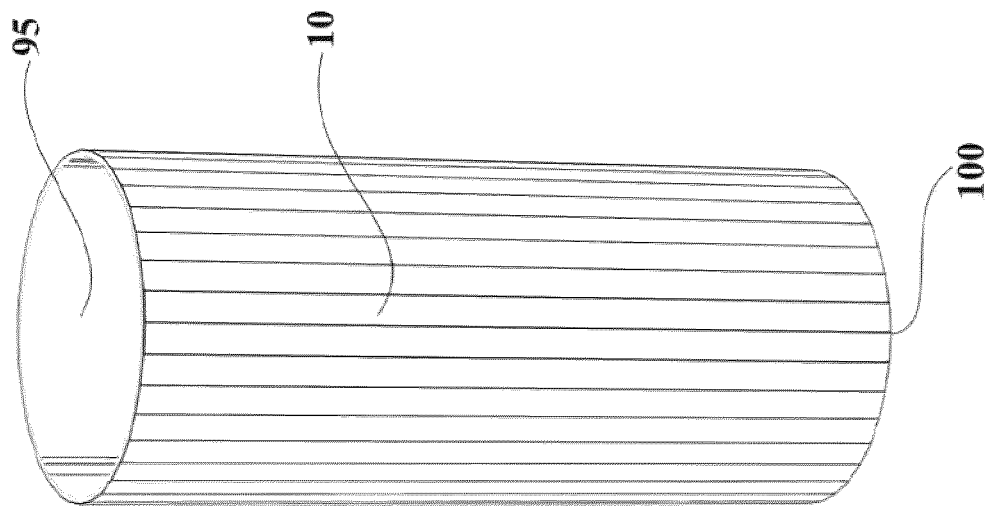
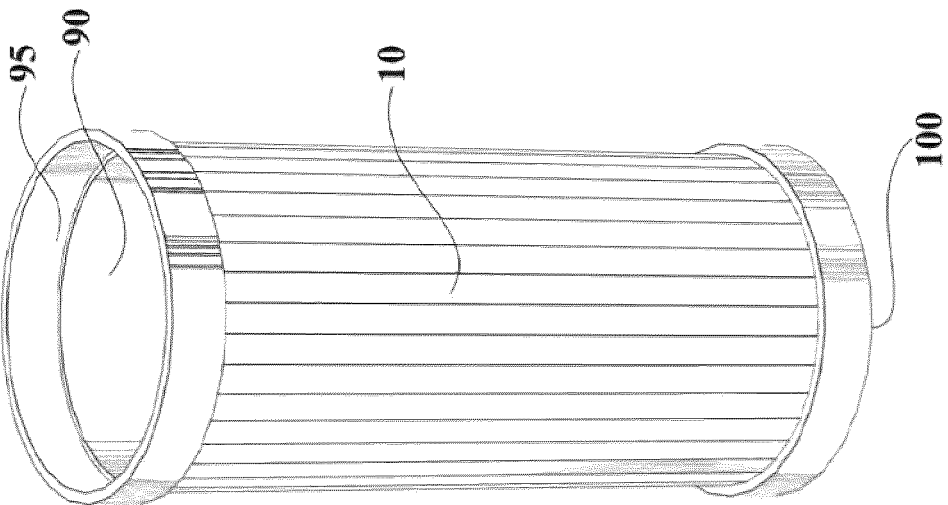

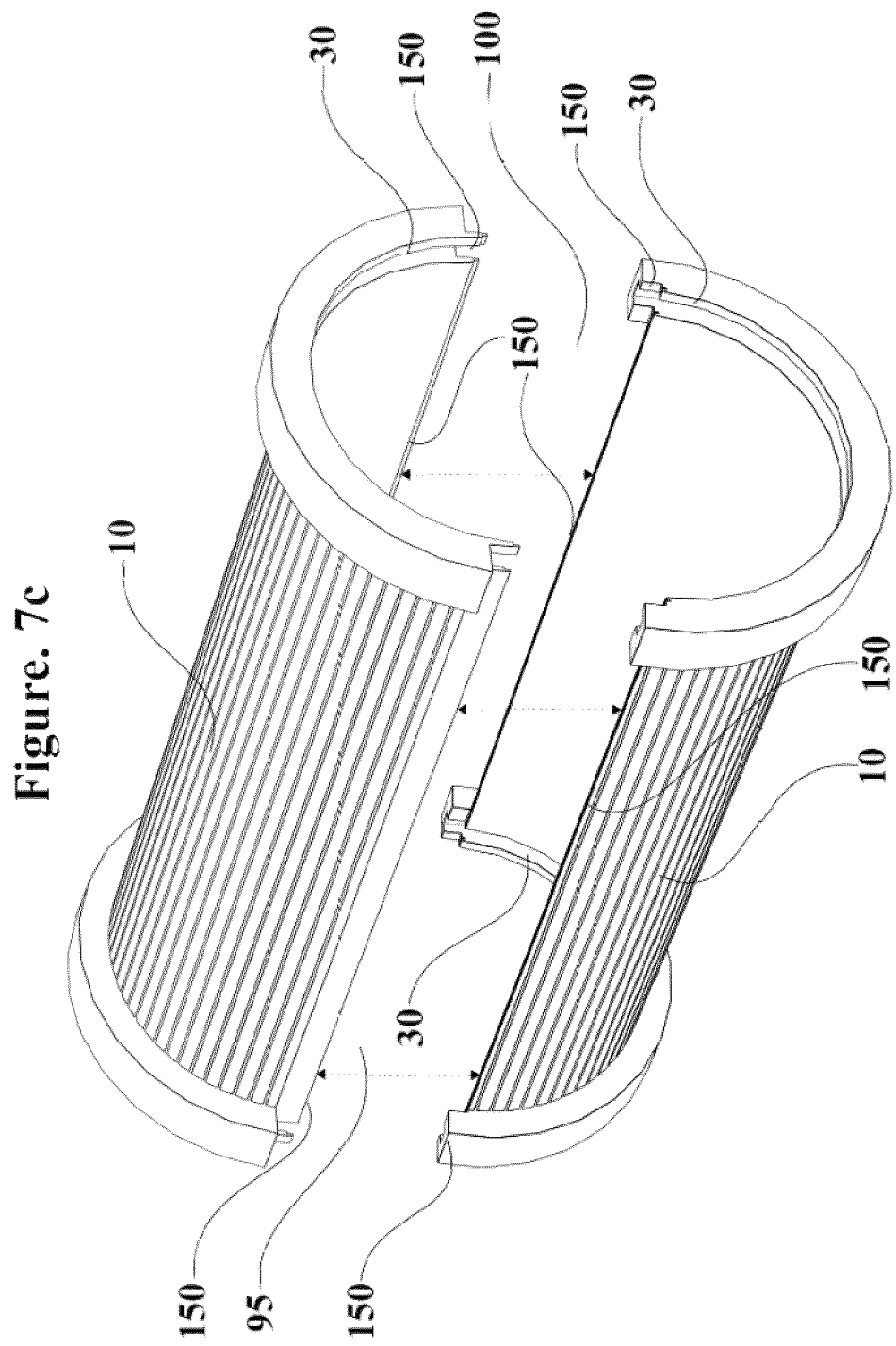

Figure. 9
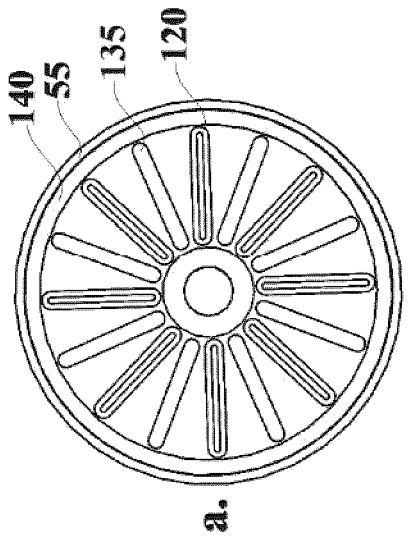
a.
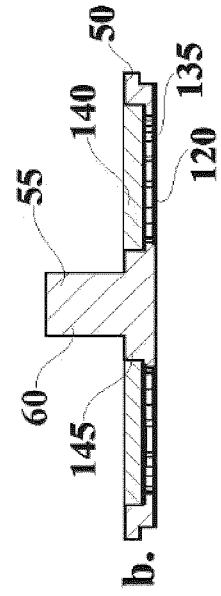
b.
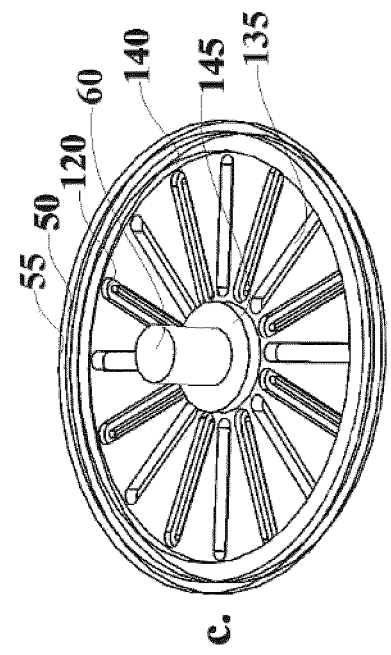
c.
Figure.10
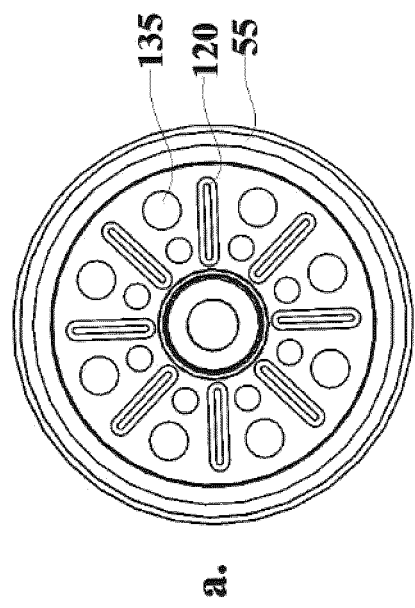
a.
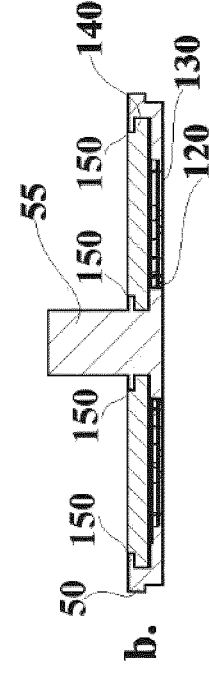
b.
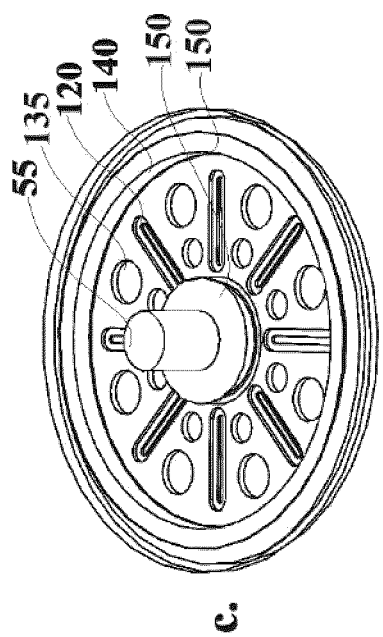
c.

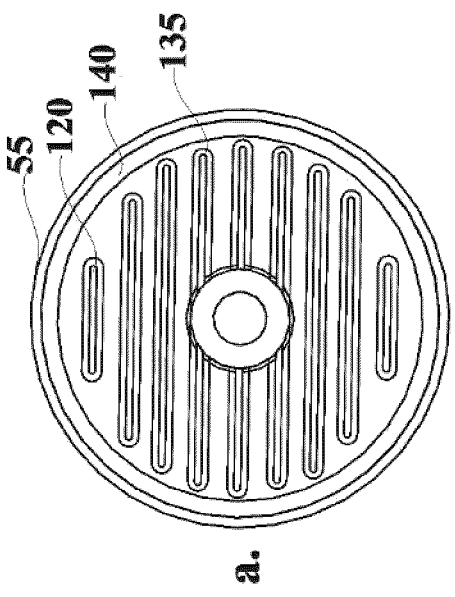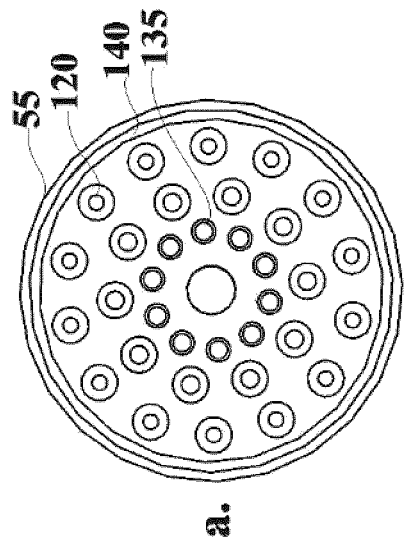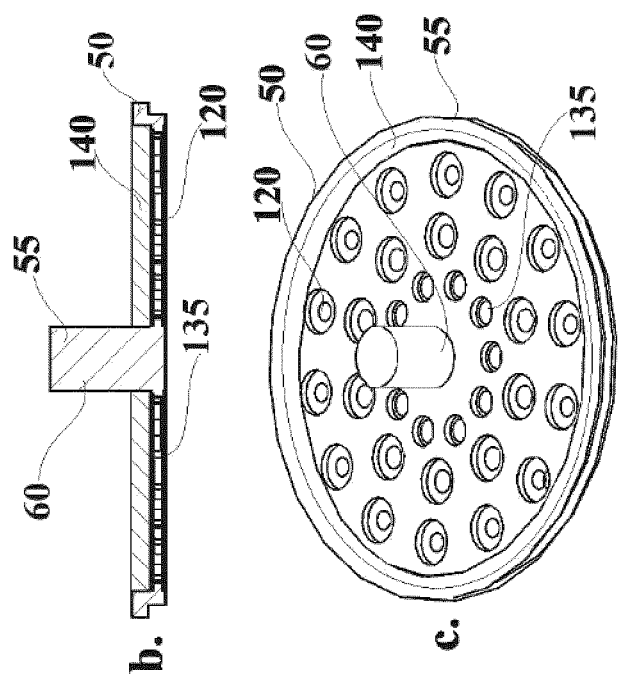

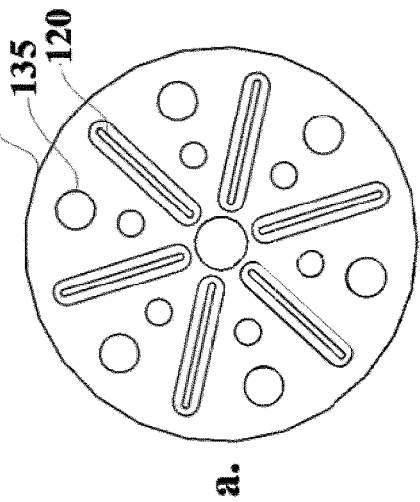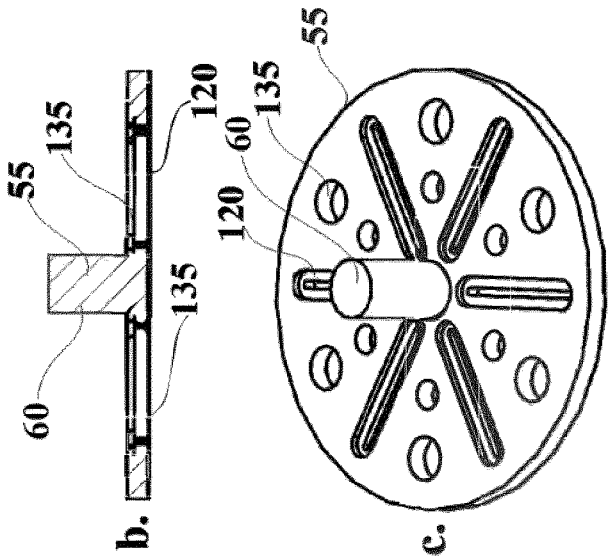
Figure. 13
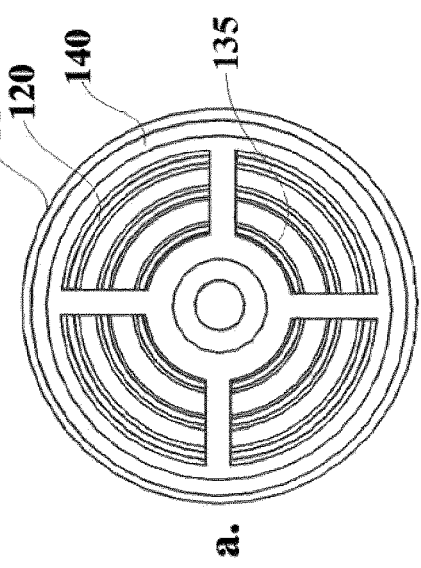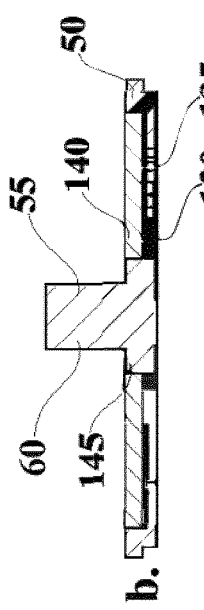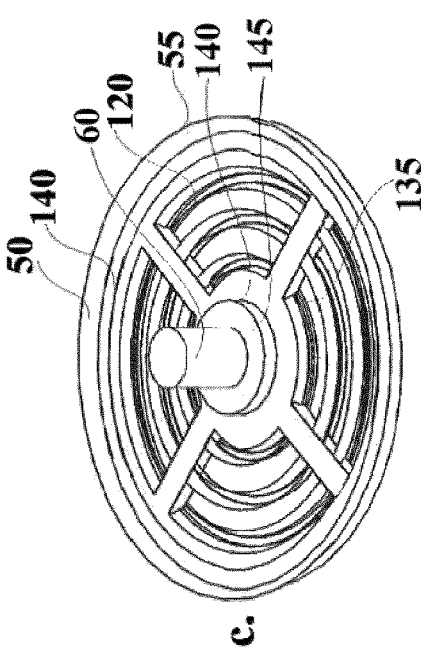
Figure. 14

Figure. 16
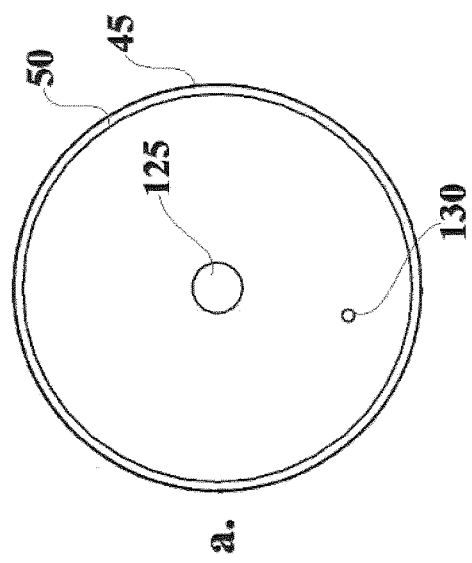
a.
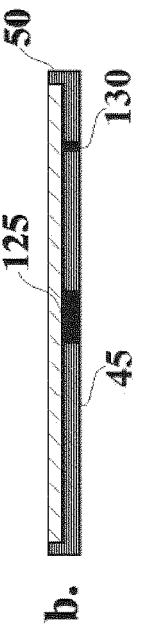
b.
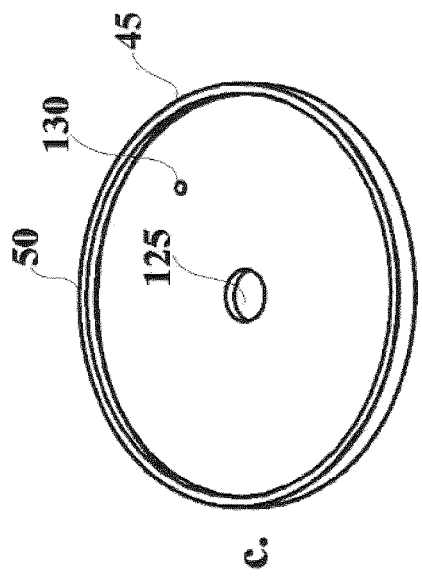
c.
Figure. 15
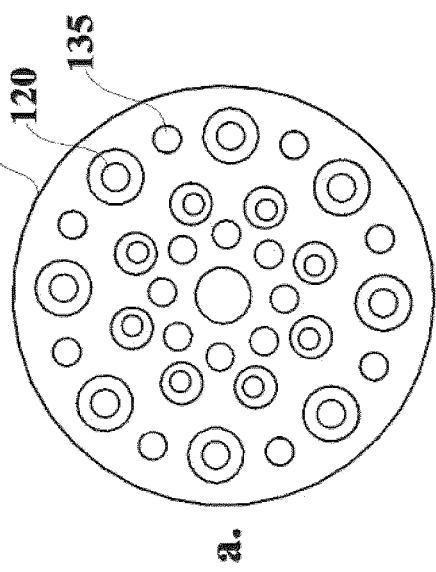
a.
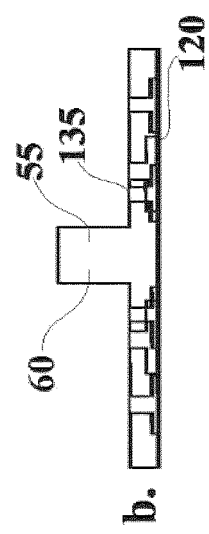
b.
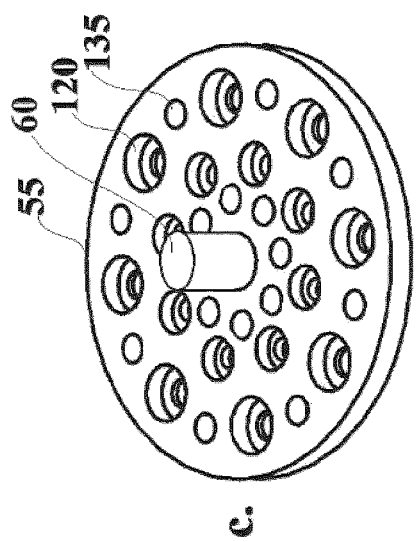
c.

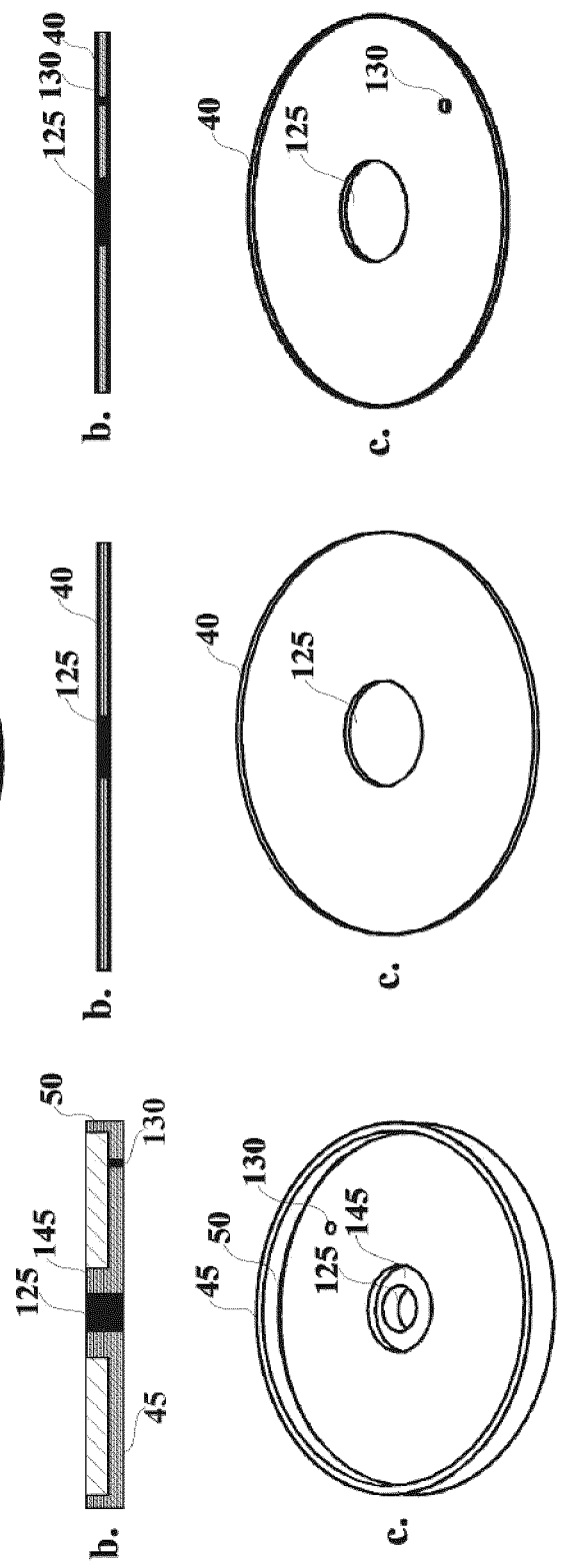
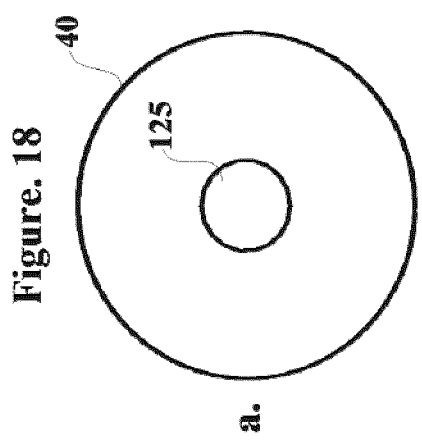
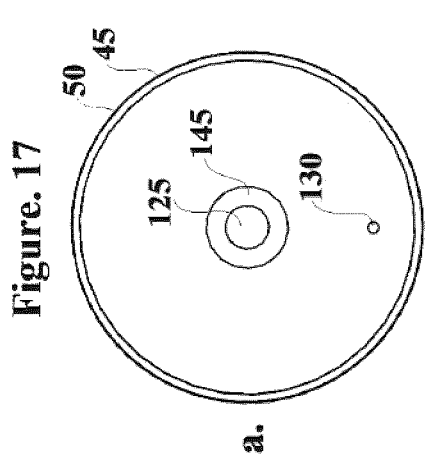

ENERGY STORAGE DEVICE WITH ELECTRICALLY ISOLATED SLEEVE HOUSING CLOSED WITH TWO SEPARATE END CAPS INTEGRATED WITH THE CURRENT TERMINALS

An energy storage device composed of an electrically isolated cylindrical sleeve housing open at both ends, closed with upper and a lower end caps integrated with terminals with an improved design.

TECHNICAL FIELD

The present disclosure relates to architecture of a cylindrical cell for an energy storage device, including supercapacitors, primary or rechargeable (secondary) batteries, and hybrid supercapacitor/battery devices, the energy storage device is comprised of an electrically isolated cylindrical sleeve housing open at both ends and closed with two separate end caps integrated with first and second current terminals of the cell with an improved design.

DESCRIPTION OF RELATED ART

There are many different types of battery cells and supercapacitor cells that are being used in electronic, electric vehicle, and energy storage applications. Of the cells, current cylindrical cells typically use a multilayer wound configuration, within the industry and referenced throughout this disclosure this wound configuration is generally referred to as a jellyroll design. The jellyroll design has a configuration wherein a multilayer cell is created with generally two separators, an anode, and a cathode. Traditional designs utilized foil protrusions or extensions called "tabs" that extended from the anode and cathode foils and connect to current collector terminals, end caps, and cell hosing. Newer designs utilize methods of folding the anode and cathode foil extensions, which are folded at the upper and lower regions of the jelly roll, then are connected directly to the end caps and terminals, these newer designs are generally referred to as tabless cells.

Typical to both tabbed and tabless cell designs the outer portion of the cell, the housing or "sleeve" which is also referenced as the "can" has been designed to be closed at one end, or open at both ends. Both housing designs, either closed at one end or open at both ends, currently utilize a design that results before or after cell assembly with one of the end caps, either the upper or lower, being electrically connected to the sleeve or can. This electrical connection is accomplished mainly by crimping or welding one end cap directly to the sleeve, or, being designed to be integrated during initial construction and formation of the cell can, which are mainly composed of stainless steel, nickel-plated iron, or aluminum.

However, having a direct electrical connection with the cell sleeve, for either end caps and or terminals, increases manufacturing challenges, cost, and limits the selection of materials for the cell and sleeve's composition. One challenge and important benefit of the invention is eliminating the limitation for the sleeve and other cell components material selection for their compositions. This is accomplished by electrically isolating the cells sleeve from active electrochemical/electrostatic and or conductive components of the cell, this results in minimizing the potential negative interactions that may occur with the sleeve and therefore minimizes potential issues such as degradation and other negative effects the sleeve may have been subjected too, or been the cause of, during operation and as such allows a number of different materials to be used for the sleeve.

When the cells sleeve is directly connected to an end cap, or to one of the terminals, the sleeve becomes part of the active electro-reactive portion of the cell. To avoid chemical reactions, existing battery and supercapacitor cell designs generally utilize the same metal for the sleeve and one or more of the electrically connected end caps and terminals. This results in more challenging manufacturing, especially when utilizing certain harder metals. Additionally current designs do not utilize polymers and rubbers as an alternative to metal cans or sleeves for cylindrical cells, which can greatly reduce manufacturing challenges, assembly steps, and lower cost by as a result of the sleeve providing the function of sealing the cell, allowing the removal of additional components, and subsequent assembly steps, that would be needed to seal the cell during assembly.

Furthermore, both traditional tabbed and tabless cells have been designed with one end cap of the cell being electrically isolated from the sleeve, which is generally accomplished by crimping one end cap using one or more gasket intermediaries to the sleeve ensuring electrical isolation of the terminal, generally the cathode. This has been accomplished by isolating the entire endcap with one or more gaskets or isolating the terminal protruding through the endcap with one or more gaskets. However, in order to allow this mechanical connection and electrical isolation, complex designs and manufacturing processes have been utilized.

These complex designs and manufacturing methods have been further complicated with advances in electrochemical performance stemmed from discoveries demonstrating that increased cell performance can be achieved by directly bonding the current collectors of the jellyroll to the terminals of the cell, mainly by welding. This increase in performance has resulted in the development of new cell designs requiring more components and assembly steps increasing the cost and complexity of manufacturing these cells further. The following description provides improvements to this practice of directly bonding the current collectors of the jellyroll directly to the current terminals of the cell in an improved manner, therein providing a better electrical connection for the current terminals and shorter path for current to travel into and out of the cell, which also simplifies the steps during manufacturing.

BACKGROUND

From prior art it is known wherein various construction aspects of A CELL WITH A TABLESS ELECTRODE. Referencing the document Patent WO 2020/096973 A1 TESLA, INC. [US/US]; 3500 Deer Creek Road, Palo Alto, California 94304 (US) the inventors of the described invention are describing energy storage devices with tabless electrodes. Until now the main problem with energy storage devices was the lower performance and higher complexity resultant from tabbed cells.

From prior art it is known wherein various construction aspects of electrical double-layer capacitors. Referencing the document Patent-WO 2017/203040 A1 SKELETON TECHNOLOGIES GROUP [EE/EE]; Vabaohumuuseumi tee 46, 13516 Tallinn (EE) the inventors of the described invention are describing electrical double-layer supercapacitors. Until now the main problem with supercapacitors was the contact bonding between the electrode and current terminal.

From prior art it is known wherein various construction aspects of AQUEOUS AND HYBRID ELECTROLYTES WITH WIDE ELECTROCHEMICAL STABILITY WINDOWS. Referencing the document Patent U.S. Pat. No. 11,038,197 B2 University of Maryland, College Park, College Park, MD (US); The United States of America as Represented by the Secretary of the Army, Washington, DC (US) the inventors of the described invention are describing aqueous and hybrid electrolytes with wide electrochemical stability windows. Until now the main problem with aqueous was the low electrochemical (voltage) stability windows.

From prior art it is known wherein various construction aspects of electrical double-layer capacitors. Referencing document EE05629, 16.04.2012, 00 Skeleton Technologies the inventors of the described invention are describing a prismatic supercapacitor. Until now the main problem with prismatic capacitor designs was the contact bonding between the electrode and current terminal.

From prior art it is known wherein various construction aspects of electrical double-layer capacitors. Referencing documents WO03/041097, 15.05.2003, Maxwell Technologies, Inc. the inventors of the described invention are describing electrical double-layer capacitors. The main problem of electrical double-layer capacitors was contact bonding between the "jellyroll" electrodes and current terminals.

From prior art it is known wherein various construction aspects of double-layer capacitors. Referencing documents US2009/0180238, 16.07.2009, Maxwell Technologies, Inc., the inventors of the described invention describe a double-layer capacitor comprising a first current collector and a second current collector having opposite sides, a first electron and second electrode disposed adjacent to opposing sides of the corresponding current collectors. The main problem of double-layer energy storage devices was contact bonding between the "jellyroll" electrodes and current terminals.

SUMMARY

Summarizing the disclosed invention and its advantages over the prior art, described herein are certain objects and advantages of the invention. It should be understood that not all objects or advantages may be achieved for any particular embodiment of the invention. Those skilled in the art will understand that any one or more particular advantage may be embodied or carried out in order to achieve or optimize a particular embodiment without necessarily achieving one or more other objects or advantages or groups of advantages as contemplated, suggested, or taught herein.

In one aspect a cylindrical cell of an electrochemical energy storage cell device is described. An energy storage cell comprises a first base material comprising a first coating, wherein a certain portion of the base material is comprised of a conductive material, a second base material comprising a second coating, and one or more separators disposed between the first and second base material, wherein the first base material, the one or more separators, and the second base material are assembled together and rolled about a central axis to form a cell.

In certain embodiments, the base material consists essentially of conductive material. In certain embodiments the conductive material is a conductive foil, weave, or mesh. In certain embodiments, the base material forms one or more current collectors. In certain embodiments the separator is positioned closest to the central axis when rolled. In certain embodiments the first base material is positioned nearest to the central axis when rolled. In alternative embodiments the second base material is positioned nearest to the central axis when rolled.

In certain embodiments, a portion of the first base material is coated with an electrically insulative material. In certain embodiments, a portion of the first base material is coated with an electrically active material. In certain embodiments, a portion of the first base material is coated with an electrode material. In certain embodiments the portion of the base material coated with an electrically insulative material is located adjacent to the uncoated portion of the base material, which the uncoated portion may comprise a predetermined width of the outer edge or edges, of the rear, the face, or both the rear and face, of the base material. In certain embodiments the base material further comprises a conductive tab or tabs. In certain embodiments the conductive tab or tabs is disposed along the length, or portion thereof, comprising of a predetermined width, of the base material's edge or edges. In certain embodiments the conductive tab or tabs of the first base material may comprise one of the upper or lower contact surface and the second base material forms another one of the upper or lower contact surface, which in certain embodiments may compose a tabless cell. In certain embodiments the conductive tab or tabs of the first base material may comprise one of the upper or lower contact surface and the second base material forms another one of the upper or lower contact surface, which in certain embodiments may compose a the current collector(s). In certain embodiments the first base material comprises one of the anode or the cathode and the second base material forms another one of the anode or the cathode. In certain embodiments the base material comprising one or more of, or two or more separately, the anode or cathode and is electrically contacting, and or forming, a portion of or all of, the contact surface. In certain embodiments the anode contact surface is electrically connected to the upper or lower end cap, and the cathode contact surface is electrically connected to another one of the upper or lower end cap. In certain embodiments the upper end cap may comprise a terminal of the cell. In certain embodiments the lower end cap may comprise a terminal of the cell.

In another embodiment, one of the upper or lower end cap integrated with the current terminal is electrically isolated from the cell sleeve. In the preferred embodiment both the upper and lower end caps integrated with terminals are electrically isolated from the cell sleeve.

In another embodiment the sleeve is open on both ends.

In another embodiment the cell sleeve is composed of a different material than one of the upper or lower end caps integrated with the current terminals. In yet another embodiment the cell sleeve is composed of a different material than both the upper and lower end caps integrated with the current terminals. In yet additional embodiments the cell sleeve is composed of one or more electrically non-conductive materials. In yet additional embodiments the cell sleeve is composed of electrically non-conductive material coated with one or more conductive materials. In another embodiment the cell sleeve is one or more conductive materials coated with one or more non-conductive materials. In another embodiment the cell sleeve is one or more conductive materials coated with one or more conductive materials. In certain embodiments the non-conductive material is an electrically insulative material. In certain embodiments the non-conductive material is a thermally insulative material.

In certain embodiments the cell sleeve is made entirely of non-conductive material such as polymer or rubber. In additional embodiments the insulator and or separator, which may be individually or in combination, runs the full length of the cell. In certain embodiments the insulator or separate insulator, such as the gasket and or sealing ring, is optional and may be omitted. In exemplified embodiments the sleeve is composed of a formable insulative material such as polymer which may include many different types of polymers. In some embodiments, the sleeve material is a polymer selected from a group consisting of polyethylene (PE; such as LDPE, HDPE, LLDPE, VLDPE), polypropylene (PP), polyethylene terephthalate (PET), polylactic acid (PLA), polystyrene (PS), polyvinyl chloride (PVC), polycarbonate (PC), polypropylene copolymer (PPCO), polymethylpentene (PMP), fluorinated polyethylene (FLPE), fluorinated ethylene propylene (Teflon® FEP), polytetrafluoroethylene (PTFE), polyvinylidene fluoride (PVDF), polyfluoroalkoxy (Teflon® PFA), ethylene-chlorotrifluoroethylene copolymer (Halar® ECTFE), ethylene-tetrafluoroethylene (Tefzel® ETFE), polyethylene terephthalate copolymer (PETG), PSF (polysulfone), polymethyl methacrylate (acrylic) (PMMA), styrene acrylonitrile (SAN), polyetherimide (PEI), or their combinations.

In this exemplified embodiment the cell sleeve is comprised of electrically insulative material such as a few non-limiting examples of polymer(s), rubber(s), epoxy, composite, combination thereof, or hard or soft insulative material, which allows the removal or omitting of the gasket and or sealing ring (as described in alternative embodiments) as the sleeve itself can be formed to produce the mechanical coupling and seal. This may be accomplished by attaching and welding the first and second end caps integrated with the current terminals to both ends of the jellyroll. Then by inserting the jellyroll into one open end of the sleeve and then through the sleeve such that the jellyroll is located inside the sleeve with the same distance to each end. Then enclose and seal the jellyroll by means of the sleeve, which may be accomplished by a few non-limiting examples such as pressing, press forming, heat pressing, compression forming, heat shrinking, curing, or securing a plurality of sleeve pieces together to form an assembly and thereby sealing the cell. Then attaching the sealing caps or sealing washers to the end caps integrated with the current terminals on one or both ends. This is then followed by welding the sealing cap or caps or sealing washer or washers to the end cap or caps integrated with the current terminals. Then followed by injecting electrolyte into one or both ends. Then followed by welding the injection port or ports. It should be noted that in this embodiment the cell sleeve can be formed to cross over the plain of one or both of the end caps integrated with current terminals to form a sealed energy storage device.

In exemplified embodiments the cell sleeve is composed of multiple pieces to form a cell sleeve assembly. In certain exemplified embodiments the cell sleeve assemblies may be composed of 2 pieces, or a plurality of pieces, that when combined form the cell sleeve. These multi-piece cell sleeve assemblies may be very beneficial to allow a simplified manufacturing process, wherein typical cylindrical cell assembly requires inserting the jellyroll into the cell sleeve, usually affixed with one or more washers/gaskets. This insertion can cause many challenges for alignment, proper placement of the washers/gaskets or insulators and as such increase's challenges and the number of manufacturing steps. Using a multi-cell assembly allows the sleeve to be formed and assembled numerous different ways, including around the jellyroll and endcaps integrated with current terminals, reducing manufacturing challenges and steps. Additionally in certain embodiments, this multi-cell assembly allows the sleeve itself to form the gasket, insulation medium, and or sealing means, to ensure a tight seal for the energy storage device. In certain embodiments the multi-cell assembly may be composed of a number of different materials including non-limiting examples of polymers and common items such as plastics, which is very beneficial to lower costs and expand the material selection for the cell sleeve.

In another embodiment the cell sleeve is composed of the same material as the upper and lower end caps. In yet another embodiment the cell sleeve is composed of the same material as one of the upper or lower end caps. In another embodiment the cell sleeve is composed of the same material as the first and second base material. In yet another embodiment the cell sleeve is composed of the same material as one of the first or second base material. In yet another embodiment the cell sleeve is composed of a different material than both of the first or second base material.

In another aspect, an electrochemical energy storage device is described. The energy storage device comprises the cylindrical sleeve housing open on both ends and is electrically isolated from both upper and lower end caps integrated with current terminals. In certain embodiments the first end forms the bottom wall. In certain embodiments the first end of the sleeve is configured to receive the first end cap. In certain embodiments the second end of the sleeve is configured to receive the second end cap. In certain embodiments, the first end cap integrated with the current terminal comprises at least one of a metal, a metal alloy, nickel (Ni), Ni-based alloy such as stainless steel, aluminum, copper, titanium, zinc or a combination of two or more the aforementioned such as a plating consisting of two or more metals. In certain embodiments, the contact surface of the first end cap comprises a helically shaped groove. In certain embodiments, the second end cap integrated with the current terminal comprises at least one of a metal, a metal alloy, nickel (Ni), Ni-based alloy such as stainless steel, aluminum, copper, titanium, zinc or a combination of two or more the aforementioned such as a plating consisting of two or more metals. In certain embodiments, the contact surface of the second end cap comprises a helically shaped groove. In certain embodiments, the first and second end caps integrated with the current terminals comprise at least one of a metal, a metal alloy, nickel (Ni), Ni-based alloy such as stainless steel, aluminum, copper, titanium, zinc or a combination of two or more of the aforementioned such as a plating consisting of two or more metals. In certain embodiments, the surface of the first and second end caps are integrated with the first and second terminals. In certain embodiments, the contact surface of the first and second end caps integrated with the current terminals comprise a helically shaped groove. In certain embodiments, the upper surface of the first and second end caps integrated with the current terminals comprise a helically shaped groove. In certain embodiments, the upper surface of the first and second end caps integrated with the current terminals comprising a helically shaped groove additionally comprise a sealing washer. In certain embodiments, the upper surface of the first and second end cap integrated with the current terminal s comprising a helically shaped groove and comprise a sealing washer also comprise at least one insulator such as a sealing ring or gasket. In certain embodiments, the upper surface of the first and second end caps integrated with the current terminals comprising a helically shaped groove additionally comprise a sealing cap. In certain embodiments, the upper surface of the first and second end cap integrated with the current terminals comprising a helically shaped groove and comprise a sealing cap also comprise a sealing ring or gasket.

In another aspect a method of cell assembly is described. The described method provides a first base material having a first coating wherein a portion of the base material comprises a conductive material, disposing a separator over the first base material, comprising a second base material having a second coating wherein a portion of the second base material comprises a conductive material, disposing the second base material over the separator, and rolling the first base material, separator, and second base material disposed in layers over each other about a central axis thereby forming a cell.

The described method in certain embodiments provides a first base material having a first coating wherein a portion of the base material comprises a conductive material, disposing a first separator under the first base material, disposing a second separator over the first base material, comprising a second base material having a second coating wherein a portion of the second base material comprises a conductive material, disposing the second base material over the second separator, and rolling the first separator, first base material, second separator, and second base material disposed in layers over each other about a central axis thereby forming a cell. In certain embodiments the first base material and second base material may be offset by a portion when layering and disposing around a central axis, wherein the first base material forms one of the cells contact surfaces when formed, and the second base material forms the second contact surface on the opposing end of the cell when formed.

In the preferred embodiment the method provides a first base material having a first coating and a second coating, wherein the base material comprises a conductive material, disposing a first separator under the first base material, disposing a second separator over the first base material, comprising a second base material having a first and second coating, wherein the second base material comprises a conductive material disposing the second base material over the second separator, and rolling the first separator, first base material, second separator, and second base material disposed in layers over each other about a central axis thereby forming a cell. In the preferred embodiment the first and second coatings for the first and second base material are electrode coatings. In the preferred embodiment the electrode coatings are formed as a freestanding electrode and then affixed to the first and second base materials. In the preferred embodiment the freestanding electrodes are affixed to the upper and lower plains of both the first and second base materials. In the preferred embodiment the freestanding electrode is composed of activated carbon, carbon black or alternative conductive additive and PTFE. In the preferred embodiment the freestanding electrode may be affixed to the first and second base material with a bonding intermediary.

In certain embodiments the first base material is in a position closest to the central axis. In certain embodiments the second base material is in a position closest to the central axis. In some embodiments a second separator is used. In certain embodiments the second separator is a coating applied to the first and or second base material(s). In some embodiments the second separator is closest in position to the central axis. In some embodiments a first separator is in the closest position to the central axis. In some embodiments the first base material, separator, and second base material are disposed over each other in a layered or successive manner. In certain embodiments the first base material, the first separator, the second base material and the second separator are disposed over each other in a layered or successive manner.

In certain embodiments, the method further comprises coating a portion of the first base material located along a portion of the width of the first base material with an electrically insulative material. In certain embodiments the coated portion is located adjacent to a second coated portion or uncoated portion. In certain embodiments the method further comprises forming a conductive contacting section partway along the length of the second base material by extending a length of the second base material transverse to a mid-plane of the second base material.

Another method of forming an energy storage device is described. The method comprises a method for forming a jellyroll and placing the jellyroll into a cell sleeve comprising a first end and second end, wherein the first end comprises a first cap comprising a contact surface and wherein the second end comprises a second cap comprising a contact surface. In certain embodiment the first end cap comprises the first terminal. In certain embodiments the second end cap comprises the second terminal. In certain embodiment the first end cap is integrated with the first terminal. In certain embodiments the second end cap is integrated with the second terminal.

In certain embodiments the method comprises electrically connecting the conductive material of the first base material with the contact surface of the first end cap integrated with the current terminal. In certain embodiments the method comprises electrically connecting the conductive material of the first base material with the contact surface of the second end cap integrated with the current terminal. In certain embodiments the method comprises electrically connecting the conductive material of the second base material with the contact surface of the first end cap integrated with the current terminal. In certain embodiments the method comprises electrically connecting the conductive material of the second base material with the contact surface of the second end cap integrated with the current terminal. In certain embodiments the method comprises electrically connecting the conductive material of the second base material with the contact surface of the second end cap integrated with the current terminal. In certain embodiments the method comprises electrically connecting the conductive material of the first base material with the contact surface of the first end cap integrated with the current terminal and electrically connecting the conductive material of the second base material with the contact surface of the second end cap integrated with the current terminal. In certain embodiments the method comprises electrically connecting the conductive material of the first base material with the contact surface of the second end cap integrated with the current terminal and electrically connecting the conductive material of the second base material with the contact surface of the first end cap integrated with the current terminal.

In one aspect, the disclosure describes an electrochemical energy storage device comprised of a cylindrical sleeve housing electrically isolated at both ends and closed with two integrated current terminal end caps, a first and second electrode, a separator or separators, said isolated cylindrical sleeve having the upper and lower end portions closed in by said integrated current terminal end caps, wherein said first or second integrated current terminal end caps having a through hole for filling energy storage device with an electrolyte, and wherein both the first current terminal and second current terminal having a seal or seals or having said electrically isolated sleeve being formed such that forming an integrated seal or seals for isolating electrically each of said current terminals from said electrically isolated cylindrical sleeve body of the energy storage device.

In the preferred embodiment, a multilayer of two or more double-layer carbon, or carbon-carbon, electrodes and two or more electrode separators are rolled successively and in an alternating configuration then placed into the electrically isolated cylindrical sleeve housing, and with an electrolyte added in order to compose an electrical double-layer capacitor (EDLC).

In some embodiments, the end caps integrated with the current terminals have on their outer edge a step with height corresponding to thickness of the seal or seals, and the current terminals have around each opening a collar extending above the plane of the end of the electrically isolated cylindrical sleeve housing, and an electrically isolated connecting sleeve which the outside diameter corresponds to the diameter of the said collars and is attached to said collars.

In some embodiments, the integrated end cap current terminals are affixed directly to the positive and negative electrodes of the jellyroll which during manufacturing having been flattened in an in one non limiting example of an inward direction, the outside diameter of the end caps integrated with the current terminals correspond to the inner diameter of the isolated sleeve housing, whereby the end caps integrated with the current terminals are fitted into the electrically isolated sleeve and hermetically sealed during manufacture.

In some embodiments, a circle shaped seal or gasket with L-shaped cross-section and is supported with shorter prong of the L-shaped cross section to the step in the outer edge of each of the end caps integrated with the current terminals and wherein the longer prong of the L-letter is directed perpendicular to the shorter prong of the L-letter positioned between the first end cap integrated with a current terminal and the electrically isolated sleeve, and wherein the longer prong of the L-letter is directed perpendicular to the shorter prong of the L-letter positioned between the second end cap integrated with a current terminal and the electrically isolated sleeve. The rolled base material with electrodes and separated with separators is centered within the isolated sleeve housing, electrically isolated from the housing and electrically connected to the upper and lower end caps integrated with the current terminals.

In some embodiments, the upper seal and lower seal are formed by compressing, with or without heat, the electrically isolated sleeve, which may comprise a nonconductive compressible material, and into contact around outer edge of each of the end caps integrated with current terminals, and is positioned between the end caps integrated with current terminals wherein electrically isolated sleeve housing ensures the end caps remain physically contacting and hermetically sealed but electrically isolated by means of the sleeve.

In certain embodiments the end caps integrated with the current terminals for an energy storage device comprise a uniformly distributed pattern-like distribution, which may include extending ridges, which may additionally be reinforcing ridges, and wherein the extending ridges may form reinforcing walls.

In some embodiments, the current terminal has through hole for filling an energy storage device such as an electrical double-layer capacitor during the manufacturing process with the electrolyte. In alternative embodiments one or both of the end caps integrated with the current terminals have a through hole for filling the energy storage device with electrolyte during the manufacturing process.

In some embodiments, the bottom side of the end caps integrated with the current terminals are welded to the flattened ends of the current collector foils bending over the plane of the cylindrical jellyroll of wound base materials affixed with electrodes. In some embodiments, the welding is laser welding or laser-spot welding.

In one aspect, there is disclosed a method for manufacturing a cylindrical cell of an energy storage device, the method comprises the steps of: a) Attach by press fitting and or welding the first end cap integrated with a terminal to the upper end of an energy storage device jellyroll, b) Attach by press fitting and or welding the second end cap integrated with a terminal to the lower end of the energy storage device jellyroll c) inserting the first end cap integrated with a terminal along with its gasket and or a sealing ring into one end of the sleeve then through the sleeve to the opposing end such that it is set slightly (like 5 mm) lower than the sleeve end edge and ensuring the second end cap integrated with a terminal along with its gasket and or a sealing ring is set slightly (like 5 mm) lower than the sleeve end edge wherein the jellyroll was inserted, d) grooving with a single or plurality of grooves the outside of the sleeve of the said opposing end in a manner to ensure the jellyroll is held in place with the first end cap and gasket intermediary e) folding/rolling the said opposing sleeve end edge of the cylindrical housing inwards, so that the supercapacitor is closed resulting in sealing the one end of the sleeve with the end cap set (integrated cap terminal, gasket and or a ring), f) ensuring the second end cap gasket and or a sealing ring are positioned such in the second end of the sleeve that it is set slightly (like 5 mm) lower than the sleeve end edge g) folding/rolling the upper edge of the cylindrical housing inwards, so that the energy storage device is closed resulting in sealing the second end of the sleeve with the second end cap set (integrated cap terminal, gasket and ring) h) then the energy storage device is filled through one of the end caps containing an electrolyte filling hole integrated with a current terminal with an electrolyte, h) the said electrolyte filling hole is closed by cap and welded to ensure a hermetic seal, wherein the connecting sleeve is electrically isolated from both the upper and lower current terminals. It should be noted in this embodiment one or both of the end caps integrated with the current terminals need to have means to hold the sealing ring(s) and or gasket(s) in place, such as a channel, groove, double edge groove, or alternate groove or edge configuration.

Another aspect is a method for manufacturing a cylindrical cell of an energy storage device, and the method comprises the steps of: In this approach, the first and second integrated cap terminals each have a double-edge groove around them to hold the sealing rings in place when inserting the sets into the sleeve: a) Attach by press fitting and or welding the first and second end cap integrated with the current terminals to the both ends of the jellyroll, b) Place the gaskets and sealing rings around the end caps integrated with the current terminals on both sides of the jellyroll, c) insert the jellyroll into the sleeve from one end such that the jellyroll is located inside the sleeve with the same distance to each end, d) groove the first end to ensure the first end cap set is fixed, e) then, seal this end by folding/rolling the upper edge of the cylindrical sleeve inwards, f) groove the second end ensuring the second end cap set is fixed, g) then, seal this end by folding/rolling the upper edge of the cylindrical sleeve inwards, h) then attach the sealing caps or sealing washers to the end caps integrated with the current terminals on one or both ends, i) followed by welding the sealing caps or sealing washers to the end caps integrated with the current terminals, j) inject electrolyte into one or both ends, k) then weld the injection port or ports.

Another aspect is a method for manufacturing a cylindrical cell of an energy storage device, and the method comprises the steps of: a) Attach by press fitting and or welding the first end cap integrated with the current terminals to one end of the jellyroll, b) place a gasket and sealing ring around the welded end cap integrated with the current terminal on one side of the jellyroll, c) insert the jellyroll into the sleeve from one end such that the jellyroll is located inside the sleeve with the same distance to each end, d) groove the welded end to ensure the welded end cap set is fixed, e) then optionally, seal this end by folding/rolling the upper edge of the cylindrical sleeve inwards, f) insert the second end cap integrated with the current terminal with a gasket and sealing ring into the second end and press against the jellyroll g) groove the second end ensuring the second end cap set is fixed, h) weld the second end cap integrated with the current terminal to the jellyroll then, seal this end by folding/rolling the upper edge of the cylindrical sleeve inwards, i) then attach the sealing caps or sealing washers to the end caps integrated with the current terminals on one or both ends, j) followed by welding the sealing caps or sealing washers to the end caps integrated with the current terminals, k) inject electrolyte into one or both ends, I) then weld the injection port or ports.

Another aspect is a method for manufacturing a cylindrical cell of an energy storage device, and the method comprises the steps of: In this approach and embodiment the cell sleeve is comprised of insulative material such as a few non-limiting examples of polymers(s), rubber(s), epoxy, composite, combination thereof, or hard or soft insulative material, which allows the removal and or omitting of the gasket(s) and or sealing ring(s) (as described in alternative embodiments) as the sleeve itself is formed to produce the mechanical coupling and seal. In this method for manufacturing a cylindrical cell of an energy storage device, and the method comprises the steps of: a) Attach by press fitting and or welding the first and second end caps integrated with the current terminals to the both ends of the jellyroll, b) insert the jellyroll into one open end of the sleeve and then through the sleeve such that the jellyroll is located inside the sleeve with the same distance to each end, c) then enclose the jellyroll by means of the sleeve which may be accomplished by a few non-limiting examples which include press, press form, heat press, compression form, heat shrink d) then attach the sealing caps or sealing washers to the end caps integrated with the current terminals on one or both ends, e) followed by welding the sealing caps or sealing washers to the end caps integrated with the current terminals f) inject electrolyte into one or both ends, g) then weld the injection port or ports.

Another aspect is a method for manufacturing a cylindrical cell of an energy storage device, and the method comprises the steps of: In this approach and embodiment the cell sleeve is comprised of a plurality of insulative material assemblies, such as a few non-limiting examples of polymers(s), rubber(s), epoxy, composite, or combination thereof, or hard or soft insulative material, which allows the sleeve itself to form the sleeve and sealing portions of the cell producing the mechanical coupling and seal. In this method for manufacturing a cylindrical cell with a plurality of insulative material assemblies for an energy storage device, and the method comprises the steps of: a) Attach by press fitting and or welding the first and second end caps integrated with the current terminals to the both ends of the jellyroll, b) assembly the plurality of insulative material assemblies, for instance two half pieces of the sleeve divided lengthwise from the upper end of the cell to the lower end of the cell, around the jellyroll to enclose said jellyroll and the first and second end caps ensuring a tight coupling, c) then ensure the cell sleeve assembly is mechanically coupled which may be accomplished by a few non-limiting examples which include press, press form, heat press, compression form, heat shrink, bonding, chemical bonding, screw(s), bolt(s) and nut(s), clasps, compression fit, threaded assembly, which may be either permanent or be disassembled d) then attach the sealing caps or sealing washers to the end caps integrated with the current terminals on one or both ends, e) followed by welding the sealing cap(s) or sealing washer(s) to the end caps integrated with the current terminals f) inject electrolyte into one or both ends, g) then weld or close the injection port or ports.

In some embodiments, the electrochemical energy storage device is a supercapacitor or ultracapacitor.

In some embodiments, an active material of an electrode can store electrical energy using the electrical double-layer (EDL) mechanism (so-called EDL-type electrode).

In some embodiments, an active material of an electrode can be a pseudocapacitive material which takes advantage of reversible surface or near-surface faradaic reactions to store charge.

In some embodiments, a supercapacitor device can be a symmetric supercapacitor in which both electrodes are the same.

In some embodiments, a supercapacitor device can be a hybrid or asymmetric supercapacitor where both electrodes are different.

In some embodiments, an active material in individual electrodes could be EDL-type, pseudocapacitance, or their composite. For example, one electrode is EDL-type and the other one is pseudocapacitance.

In some embodiments, an active material in one electrode is EDL-type, pseudocapacitive, or their composite, and the other one is a battery-type electrode, such as lithium-ion capacitor, zinc-ion capacitor, sodium-ion capacitor.

In some embodiments, the electrochemical energy storage device is a rechargeable (or secondary) battery.

In some embodiments, the electrolyte can be selected from aqueous, super-concentrated aqueous electrolyte, hybrid electrolyte, or organic electrolytes.

In some embodiments, the super-concentrated aqueous electrolyte further comprises at least one metal salt in water with a molal concentration between 10 m and 100 m. Examples include water-in-salt and water-in-bisalt electrolytes.

In some embodiments, the hybrid electrolyte further comprises at least one salt in a mixture of water and at least one non-aqueous solvent, wherein the molal concentration is between 0.1 m and 100 m, wherein the volume percent of water in the solvent mixture is between 1% to 99%, wherein the non-aqueous solvent is an organic solvent or a molecular solvent, and wherein the salt can be selected from any kind of organic salt or inorganic salt.

In some embodiments, the electrolyte can be an organic electrolyte.

In some embodiments, the electrode substrates and or base material (current collector) are selected from metals such as aluminium (Al), copper (Cu), titanium (Ti), nickel (Ni), stainless steel (Ss), a metal-based alloy, and carbonous materials such as graphite and carbon cloth, and wherein the current collector for the anode and cathode can be different.

The foregoing was intended as a broad summary only and only of some of the aspects of the invention. It was not intended to define the limits or requirements of the invention. Other aspects of the invention will be appreciated to one skilled in the art by reference to the detailed description of the preferred embodiment and to the claims. It is intended that all such additional systems, methods, aspects, and advantages be included with this description, and within the scope of the present disclosure, and be protected by the accompanying claims.

The terms used in this disclosure are not for limiting the inventive concept but for explaining the embodiments. The terms of a singular form may include plural forms unless otherwise specified. Also, the meaning of "include," "comprise," "including," or "comprising," specifies a property, a region, a fixed number, a step, a process, an element and/or a component but does not exclude other properties, regions, fixed numbers, steps, processes, elements and/or components. The reference numerals presented according to a sequence of explanations are not limited to the sequence.

In addition, some embodiments of the present disclosure may include patents or public disclosures already issued relating to this art, when used in conjunction with this system or method these prior schemes may be able to utilize substantial amounts of this disclosure to improve a devices operation and or useful life expectancy, and when referring to these said inventions or schemes when combined with this disclosed system or method these devices should be considered new devices or improvements thereof and confer the protection of this disclosure, or patent, this does not limit the scope of the present disclosure instead giving reference to where some embodiments of this discovery may fit into the art.

In an aspect, the disclosure describes an energy storage device. The energy storage device also includes an energy-storage member defining a first current collector at a first end thereof and a second current collector at a second end that is opposite the first end; a first end cap electrically connected to the first current collector; a second end cap electrically connected to the second current collector; and an open-ended sleeve dimensioned complementarily to the energy-storage member and receiving the energy-storage member such that the first and second ends face opposite open ends of the sleeve, the sleeve being structurally coupled to the first and second end caps such that the sleeve is electrically isolated from the energy-storage member, the first end cap, and the second end cap.

Implementations may include one or more of the following features. The energy storage device further comprising: at least one insulator positioned between the energy storage member and the sleeve to electrically isolate the energy-storage member from the sleeve. A first insulator of the at least one insulator circumscribes the energy-storage member at the first end and contacts the sleeve adjacent the first end cap, a second insulator of the at least one insulator separate from the first insulator circumscribes the energy-storage member at the second end and contacts the sleeve adjacent the second end cap, a first circumferential edge of the sleeve being proximal to the first end cap, the first insulator being sandwiched between the sleeve and the first end cap, a second circumferential edge of the sleeve being proximal to the second end cap, the second insulator being sandwiched between the sleeve and the second end cap. The at least one insulator extends circumferentially around the energy-storage member at the first and second ends and contacts the sleeve at the opposite open ends of the sleeve, the first and second end caps defining first and second terminals projecting therefrom, respectively, the energy storage device further comprising: a first plate extending across the first end cap and having a first aperture therethrough dimensioned for receiving the first terminal; a second plate extending across the second end cap and having a second-plate aperture therethrough dimensioned for receiving the second terminal, wherein the at least one insulator is sandwiched between the sleeve and the first and second plates. The sleeve and the at least one insulator are in unitary construction. The first end cap is welded to the first current collector at a first welding channel formed in the first end cap, the second end cap being welded to the second current collector at a second welding channel formed in the second end cap. The first end cap has one or more electrolyte openings formed therein suitable for receiving electrolyte into the sleeve, the energy storage device further comprising: the electrolyte disposed in the sleeve such that the electrolyte substantially permeates the energy-storage member; and a plate integrally coupled to the first end cap for sealing the one or more electrolyte openings. The plate extends across the first end cap to form an overhang extending over a circumferential edge of the first end cap, the at least one insulator being positioned at least partially over the overhang, the at least one insulator being sandwiched the insulator between the sleeve and the overhang so as to maintain the sleeve in electrical isolation from the energy-storage member. The opposite open ends of the sleeve are substantially equal-sized, the first and second end caps being substantially equal-sized to complement the opposite open ends of the sleeve. The sleeve is cylindrical and the energy-storage member comprises a roll defined by a first electrode assembly, a second electrode assembly, a first separator, and a second separator being rolled together such that the first electrode assembly is sandwiched between the first and second separators, and the second separator is sandwiched between the first and second electrode assemblies. The energy storage device further comprising: hybrid electrolyte disposed in the sleeve to substantially permeate throughout the energy-storage member. The hybrid electrolyte comprises at least one salt in a mixture of water and at least one non-aqueous solvent, the molal concentration of the at least one salt in the mixture being between 3.5 m and 12 m. The energy storage device further comprising: super-concentrated aqueous electrolyte disposed in the sleeve to substantially permeate throughout the energy-storage member. The super-concentrated aqueous electrolyte comprises at least one salt in water at a molal concentration between 7 m and 100 m. The first current collector includes an electrode substrate composed of a material including at least one of aluminium copper, titanium, nickel, stainless steel, a metal-based alloy, a carbonous material, graphite, or carbon cloth.

In an aspect, the disclosure describes a method of manufacturing an energy storage device. The method also includes (a) electrically connecting a first end cap to a first current collector at a first end of an energy-storage member; (b) electrically connecting a second end cap to a second current collector at a second end of the energy-storage member that is opposite the first end, (c) receiving the energy-storage member into an open-ended sleeve complementary thereto such that the first and second end caps face opposing open ends of the sleeve, and (d) structurally coupling the sleeve to the first and second end caps such that the sleeve is electrically isolated from the energy-storage member and the first and second end caps.

Implementations may include one or more of the following features. The method wherein at least one insulator is positioned between the energy-storage member and the sleeve while step (d) is executed. Step (c) comprises: inserting the energy-storage member into the sleeve; and placing the at least one insulator between the energy-storage member and the sleeve. Step (c) comprises positioning a first insulator of the at least one insulator at the first end such that the first insulator circumscribes the energy-storage member and contacts the sleeve, the method further comprising: positioning a second insulator of the at least one insulator in the sleeve between the energy-storage member and the sleeve such that the second insulator circumscribes the energy-storage member and contacts the sleeve. Step (d) comprises crimping the sleeve, at a circumferential edge of the sleeve, over the at least one insulator when the at least one insulator is positioned at least partially over the first and second end caps. The at least one insulator and the sleeve are in unitary construction. Step (a) comprises welding the first end cap to the first current collector at a first welding channel formed in the first end cap, and step (b) comprises welding the second end cap to the second current collector at a second welding channel formed in the second end cap. Step (a) comprises electrically connecting the first end cap when a first terminal of the energy storage device projects, by unitary construction, outwardly from the first end cap, and step (b) comprises electrically connecting the second end cap when a second terminal of the energy storage device projects, by unitary construction, outwardly from the second end cap. The method further comprising: inserting the first projection into a first aperture of a first plate when the first end cap defines a first one or more openings; sealing the first one or more openings by welding the first plate to the first end cap at the first aperture; inserting the second projection into a second aperture of a second plate when the second end cap defines a second one or more openings; and sealing the second one or more openings by welding the second plate to the second end cap at the second aperture. The method further comprising: injecting electrolyte into the sleeve via one or more electrolyte openings formed in the first end cap to cause the electrolyte to permeate the energy-storage member; and sealing the electrolyte openings by attaching a plate to the first end cap. At least one insulator is positioned between the energy-storage member and the sleeve while step (d) is executed, step (c) comprises positioning the at least one insulator when the plate extends over a circumferential edge of the first end cap to form an overhang such that the at least one insulator is positioned at least partially over the overhang, and step (d) comprises crimping a circumferential edge of the sleeve over the at least one insulator to sandwich the at least one insulator between the sleeve and the overhang while maintaining the sleeve electrically isolated from the energy-storage member.

Disclosed is an energy storage device, comprising: an energy-storage member defining a first current collector at a first end thereof and a second current collector at a second end that is opposite the first end; a first end cap electrically connected to the first current collector; a second end cap electrically connected to the second current collector; and an open-ended sleeve dimensioned complementarily to the energy-storage member and receiving the energy-storage member such that the first and second ends face opposite open ends of the sleeve, the sleeve being structurally coupled to the first and second end caps such that the sleeve is electrically isolated from the energy-storage member, the first end cap, and the second end cap; wherein the first end cap has one or more electrolyte openings formed therein suitable for receiving electrolyte into the sleeve, the energy storage device further comprising: the electrolyte disposed in the sleeve such that the electrolyte substantially permeates the energy-storage member; a first plate integrally coupled to the first end cap for sealing the one or more electrolyte openings; and at least one insulator positioned between the energy-storage member and the sleeve to electrically isolate the energy-storage member from the sleeve, wherein the first plate extends across the first end cap to form an overhang extending over a circumferential edge of the first end cap, the at least one insulator being positioned at least partially over the overhang, the at least one insulator being sandwiched between the sleeve and the overhang so as to maintain the sleeve in electrical isolation from the energy-storage member.

BRIEF DESCRIPTION OF DRAWINGS

FIG. 5 is a cross sectional view of a preferred embodiment showing the upper components of the cell.

FIG. 7 is a side view of the electrically isolated sleeve. FIG. 7a shows an exemplified embodiment that has grooves formed around the upper and lower portions of the sleeve. FIG. 7b shows an embodiment of the sleeve wherein no grooves have been pre-formed. FIG. 7c shows an embodiment of the sleeve wherein the cell sleeve is a multi-part assembly, which this figure depicts a two-sleeve assembly.

FIG. 9 shows a preferred embodiment of the end cap integrated with the current terminal with FIG. 9a being a top view, FIG. 9b a cross sectional side view, and FIG. 9c a forward facing 45-degree angle directed view.

FIG. 10 shows a preferred embodiment of the end cap integrated with the current terminal with FIG. 10a being a downward directed top view, FIG. 10b a cross sectional side view, and FIG. 10c a forward facing 45-degree angle directed view.

FIG. 11 shows a preferred embodiment of the end cap integrated with the current terminal with FIG. 11a being a downward directed top view, FIG. 11b a cross sectional side view, and FIG. 11c a forward facing 45-degree angle directed view.

FIG. 12 shows a preferred embodiment of the end cap integrated with the current terminal with FIG. 12a being a downward directed top view, FIG. 12b a cross sectional side view, and FIG. 12c a forward facing 45-degree angle directed view.

FIG. 13 shows a preferred embodiment of the end cap integrated with the current terminal with FIG. 13a being a downward directed top view, FIG. 13b a cross sectional side view, and FIG. 13c a forward facing 45-degree angle directed view.

FIG. 14 shows a preferred embodiment of the end cap integrated with the current terminal with FIG. 14a being a downward directed top view, FIG. 14b a cross sectional side view, and FIG. 14c a forward facing 45-degree angle directed view.

FIG. 15 shows a preferred embodiment of the end cap integrated with the current terminal with FIG. 15a being a downward directed top view, FIG. 15b a cross sectional side view, and FIG. 15c a forward facing 45-degree angle directed view.

FIG. 16 shows a preferred embodiment of the sealing cap with FIG. 16a being a downward directed top view, FIG. 16b a cross sectional side view, and FIG. 16c a forward facing 45-degree angle directed view.

FIG. 17 shows a preferred embodiment of the sealing cap with reinforcing walls with FIG. 17a being a downward directed top view, FIG. 17b a cross sectional side view, and FIG. 17c a forward facing 45-degree angle directed view.

FIG. 18 shows a preferred embodiment of the sealing washer with FIG. 18a being a downward directed top view, FIG. 18b a cross sectional side view, and FIG. 18c a forward facing 45-degree angle directed view.

FIG. 19 shows a preferred embodiment of the sealing washer with an electrolyte filling port with FIG. 19a being a downward directed top view, FIG. 19b a cross sectional side view, and FIG. 19c a forward facing 45-degree angle directed view.

DETAILED DESCRIPTION

Figure 1:
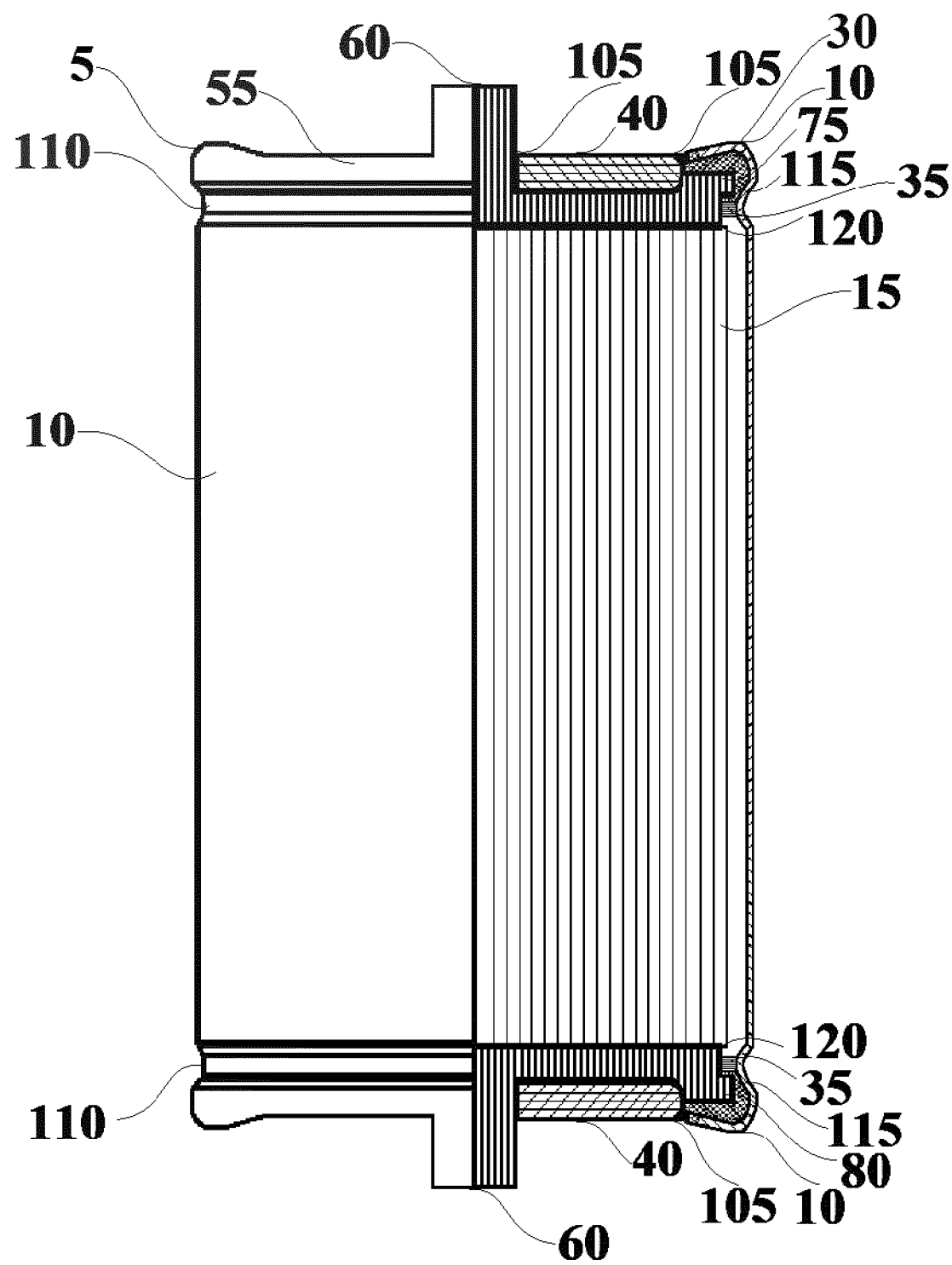
FIG. 1 is a preferred embodiment of the disclosed system and method for an energy storage device with electrically isolated sleeve and improved end caps integrated with the current terminals which shows a half view half cross section for the device.

FIG. 1 is a preferred embodiment of the disclosed system and method for an energy storage device 5 with electrically isolated sleeve 10 and improved end cap integrated with the current terminal 55 which shows a half view half cross section for the device. The energy storage device 5 includes sleeve 10 open at both ends and upper end cap integrated with the current terminal 75 for the upper open end 95, and a lower end cap integrated with the current terminal 80 for the lower open end 100. The design of the end cap integrated with the current terminal 55 allows for direct electrical connection to the jellyroll 15, this is accomplished through welding connections 120. In certain embodiments end cap integrated with the current terminal's 55 assemblies additionally come with sealing washer's 40 and in this nonlimiting example is disposed over the terminal 60 portion of the end cap integrated with the current terminal 55 and is held in place and hermetically sealed by means of welds 105 or alternative affixing means, such as non-limiting examples of pressing, heat pressing, folding, crimping, or grooving. The sleeve 10 is electrically isolated from the jellyroll 15 and the upper and lower end caps integrated with the current terminals 75, 80, by means of an electrically non-conductive gasket(s) 30, and in certain embodiments a the sealing ring(s) 35, and separator (not shown). Additionally, in certain embodiments the end cap integrated with the terminal 55 has a crimp 110 on the outside of the sleeve 10 to depress the gasket 30, which may be formed prior or post the insertion of the jellyroll. In certain embodiments, the sealing ring 35 and the sleeve 10 form a tight seal, wherein the sleeve 10 also has a ceiling bend 115 to hermetically seal the energy storage device 5, the bend runs perpendicular to the sleeve across the plain of the gasket 30 and depresses into the gasket 30 to ensure a complete seal.

In some embodiments, an electrode (shown as assembled jellyroll 15) is composed of an active material, a conductive additive, and a binder. In some embodiments, an electrode is composed of an active material and a binder. In the preferred embodiment, the binder is polytetrafluoroethylene (PTFE). In some embodiments, the binder is selected from a group consisting of PTFE, polyvinylidene fluoride (PVDF), polyvinylpyrrolidone (PVP), polyacrylic acid (PAA), cellulose, carboxymethyl cellulose, styrene butadiene rubber, casein, sodium alginate, gum arabic, gellan gum, xanthan gum, guar gum, polyethylene oxide (PEO), polyethylene glycol (PEG), gelatin, chitosan, polyvinyl alcohol (PVA), polyvinyl acetate, or their combinations. In some embodiments the electrode is an "ink type" electrode. In the preferred embodiment the electrode is an dry electrode or "freestanding type" electrode.

In some embodiments, the separator (shown as assembled jellyroll 15) is electrically insulative and composes of pores. In the preferred embodiment, the separator is a cellulose separator. In some embodiments, the separator is selected from glass fibres, cellulose derivatives, polymer membranes as such polypropylene, polyethylene, polytetrafluoroethylene, polyvinylidene fluoride, and polyvinyl chloride, or their combinations. In the preferred embodiment, the thickness of the separator is in a range between 5 µm and 80 µm. In some embodiments, the thickness of the separator is in a range between 1 µm and 300 µm. In some embodiments, the separator comprises multiple layers. In some embodiments, the separator may be coated with other materials.

In some embodiments, electrode materials (shown as assembled jellyroll 15) are coated on or attached to an electrically conductive substrate (also called current collector) by any means known to persons skilled in the art. In the preferred embodiments, the electrode substrates are foils made up of an alloy of stainless steel, or titanium which is preferred. In some embodiments, the electrode substrates are selected from metals such as aluminium (Al), copper (Cu), titanium (Ti), nickel (Ni), stainless steel (ss), a metal-based alloy, and carbonous materials such as graphite and carbon paper or combination thereof. In some embodiments, the current collector materials for the anode and cathode are different. In some embodiments, the electrode materials and a binder are mixed and connected to the substrate using a dry approach. In some embodiments, the electrode materials are coated on the substrate using a wet approach, in certain embodiments therein an aqueous or non-aqueous liquid is used to make paste or ink of materials and a binder. In some embodiments therein an aqueous (water based), or non aqueous, or organic liquid (organic solvent) formed with an additional material is used to form a binder used to affix the electrode to the electrode substrates, which in additional embodiments may have an additional conductive additive. In the preferred embodiment the organic liquid is N-Methyl- 2-pyrrolidone (NMP) and the additional material is PVDF. In some embodiments, the binder is selected from a group consisting of PTFE, polyvinylidene fluoride (PVDF), polyvinylpyrrolidone (PVP), polyacrylic acid (PAA), cellulose, carboxymethyl cellulose, styrene butadiene rubber, casein, sodium alginate, gum arabic, gellan gum, xanthan gum, guar gum, polyethylene oxide (PEO), polyethylene glycol (PEG), gelatin, chitosan, polyvinyl alcohol (PVA), polyvinyl acetate, or their combinations.

In the preferred embodiment, the electrochemical energy storage device 5 is a supercapacitor.

In certain embodiments, the energy storage device 5 is a symmetric supercapacitor in which both electrodes (shown as assembled jellyroll 15) are the same. In some embodiments, the energy storage device 5 is hybrid or asymmetric supercapacitor where both electrodes and or electrode substrates (shown as assembled jellyroll 15) are different. In some embodiments, the active material of an electrode (shown as assembled jellyroll) can store electrical energy mainly using the electrical double-layer (EDL) mechanism (so-called EDL-type electrode). In some embodiments, the EDL-type electrode material (shown as assembled jellyroll) is electrically conductive and porous with micropores, mesoopores and macropores. In the preferred embodiment, the active materials of electrodes (shown as assembled jellyroll 15) are composed of an activated carbon. In some embodiments, the EDL-type electrode material (shown as assembled jellyroll 15) is selected from conductive porous carbons such as activated carbons, mesoporous carbons, hierarchical porous carbons, graphene-based materials, activated graphene, exfoliated graphite, activated exfoliated graphite, carbon nanotube-based materials, carbide-derived carbons, and or combinations thereof. In some embodiments, the active materials of electrodes (shown as assembled jellyroll 15) are composed of conductive porous materials with functional groups such as oxygen- and nitrogen-containing groups. In some embodiments, the active materials of electrodes (shown as assembled jellyroll 15) are composed of conductive porous materials which are doped with heteroatoms such as nitrogen, oxygen, sulfur, phosphorus, chlorine, bromine, and iodine. In some embodiments, the active material of electrodes (shown as assembled jellyroll 15) is a nanostructure with a certain shape, size, and porosity.

In some embodiments, the active material of the energy storage device 5 electrode (shown as assembled jellyroll 15) may be a pseudocapacitive material which takes advantage of reversible surface or near-surface Faradaic reactions to store charge. In some embodiments, the pseudocapacitive materials are selected from conducting polymers (such as polyaniline, polypyrrole, and poly(3,4-ethylenedioxythiophene (PEDOT)-based polymers), transition metal oxides and hydroxides (such as $RuO_2$, $V_2O_5$, $NiO_x$, $CoO_x$, $FeO_x$, $MnO_2$, $Ni(OH)_2$, $Co(OH)_2$), and nitrides (such as vanadium nitride), sulfides (such as vanadium disulfide) and or combinations thereof. In some embodiments, the active material is Mxene.

In some embodiments, the electrode materials (shown as assembled jellyroll 15) of an asymmetric supercapacitor are selected from EDL-type materials, pseudocapacitance, or their composite. In some embodiments of the energy storage device 5, one electrode (shown as assembled jellyroll) is EDL-type and the other one is pseudocapacitance (shown as assembled jellyroll 15).

In some embodiments, the energy storage device 5 is a hybrid supercapacitor (shown as assembled jellyroll 15) wherein one electrode (shown as assembled jellyroll 15) is capacitor type and the other one is battery type (shown as assembled jellyroll 15). In some embodiments, the cathode material (shown as assembled jellyroll 15) in the hybrid supercapacitor is EDL-type, pseudocapacitive, or their composite. In some embodiments, the battery-type anode (shown as assembled jellyroll 15) is selected from an insertion type (such as lithium titanate (LTO), $V_2O_5$, $Nb_2O_5$), a conversion type (such as $Fe_3O_4$), alloy type (such as silicon, tin), metallic (zinc), a carbonous material, and the like. In some embodiments, the battery-type anode is a composite of two or more materials. In some embodiments, the energy storage device 5 is lithium-ion capacitor, wherein the anode active material (shown as assembled jellyroll 15) allows for reversible intercalation of lithium ions such as lithium titanate (LTO, $Li_4Ti_5O_{12}$). In some embodiments, the energy storage device 5 is zinc-ion capacitor, wherein the anode active material (shown as assembled jellyroll 15) allows for reversible plating and stripping of zinc ions such as metallic zinc or a zinc-based composite. In some embodiments, the energy storage device 5 is sodium-ion capacitor.

In some embodiments, the energy storage device 5 is a rechargeable (or secondary) battery. In some embodiments, the energy storage device 5 is lithium-ion battery, or iron phosphate battery. In some embodiments, the anode active material (shown as assembled jellyroll 15) in the energy storage device 5 is selected from a carbonaceous material (e.g., graphitic carbon, graphite, graphene-based materials, hard carbon, soft carbon, carbon nanotubes, porous carbon), a silicon-based material (e.g., silicon and silicon dioxide), lithium titanate (LTO, $Li_4Ti_5O_{12}$), tin, tin oxide ($SnO_x$), molybdenum oxide ($MoO_2$), molybdenum disulfide ($MoS_2$), nickel oxide ($NiO_x$), copper oxide ($CuO_x$), and or combinations thereof. In some embodiments, the cathode active material (shown as assembled jellyroll 15) in energy storage device 5 is selected from a carbonaceous material, a lithium nickel manganese cobalt oxide (NMC, e.g., Li(NiMnCo)$O_2$), a lithium manganese oxide (LMO, e.g., $LiMn_2O_4$), a lithium cobalt oxide (LCO, e.g., $LiCoO_2$), a lithium nickel cobalt aluminum oxide (NCA, e.g., $LiNi_{0.8}Co_{0.15}Al_{0.05}O_2$), $LiMn_{1.5}Ni_{0.5}O_4$ (LMNO), an olivine (such as $LiFePO_4$), chalcogenides ($LiTiS_2$), tavorite ($LiFeSO_4F$), manganese oxide ($MnO_x$), sulfur, lithium sulfide ($Li_2S$), and or combinations thereof. In some embodiments, the energy storage device 5 is sodium-ion battery. In some embodiments, the battery is zinc-ion battery.

In some embodiments, the electrolyte (not shown) for the energy storage device 5 is an organic electrolyte. In some embodiments, the electrolyte (not shown) for the energy storage device 5 is an aqueous electrolyte. In some embodiments, the electrolyte (not shown) for the energy storage device 5 is an ionic liquid, concentrated or with solvents.

In the preferred embodiment, the electrolyte (not shown) for the energy storage device 5 is a hybrid electrolyte which comprises at least one salt in a mixture of water and at least one non-aqueous solvent. In some embodiments, the molal concentration of the hybrid electrolyte (not shown) for the energy storage device 5 is between 0.1 m and 100 m. In some embodiments, the volume percent of water in the electrolyte solvent mixture (not shown) for the energy storage device 5 is between 1% to 99%. In some embodiments, the non-aqueous solvent(s) for the electrolyte (not shown) for the energy storage device 5 is an organic solvent or other solvents. In some embodiments, the salt is not soluble in the so-called non-aqueous solvent.

In the preferred embodiment, the salt is $NaClO_4$ in the hybrid electrolyte (not shown) for the energy storage device 5. In some embodiments, the salt in the hybrid electrolyte (not shown) for the energy storage device 5 can be selected from any kinds of organic salt, inorganic salt, acid, and base. In some embodiments, one or more salts are selected from the group consisting of NaClO4, Al(ClO4)3, Ca(ClO4)2, Fe(ClO4)3, AgClO4, Li2SO4, Na2SO4, K2SO4, potassium acetate (KOAc), LiOAc, NaOAc, CsOAc, Zn(OAc)2, ZnBr2, ZnI2, ZnCl2, Zn(NO3)2, Zn(ClO4)2, ZnSO4, NH4NO3, LiNO3, NaNO3, Al(NO3)3, LiCl, CsCl, LiBr, NaBr, CaBr2, Ca(BrO3)2, and LiBrO3.

In some embodiments, one or more salts used in the hybrid electrolyte (not shown) or organic electrolyte (not shown) for the energy storage device 5 are selected from the group consisting of a quaternary ammonium salt (such as tetraethylammonium tetrafluoroborate (TEA BF4) and triethylmethylammonium tetrafluoroborate (TEMA BF4)), a quaternary phosphonium salt. In some embodiments of the energy storage device, the salt (not shown) comprises a cation selected from the group consisting of $(R_1R_2R_3R_4)N^+$ or $(R_1R_2R_3R_4)P^+$ where R1, R2, R3, and R4 (can be the same group or different) are alkyl groups of up to —CH3 to —C5H11 or cyclic phenyl ring —C6H5, and the anion is selected from the group consisting of tetrafluoroborate (BF4), hexafluorophosphate (PF6), tetraphenylborate anion (Ph4B), trifluoromethane sulfonate (Otf), etc.

In some embodiments of the energy storage device 5, the non-aqueous solvent(s) used the hybrid electrolyte (not shown) is selected from one or more of the group consisting of an alcohol, a ketone, a carboxylic acid, an ester, carbonic acid, an amine, an amide, a nitrile, an inorganic acid, an ether, a sulfone, a sulfoxide, a sulfate, a phosphate ester, a hydrocarbon, or their combinations. In some embodiments of the energy storage device 5, the non-aqueous solvent used the hybrid electrolyte (not shown) is an ionic liquid such as aprotic ionic liquids (e.g., 1-ethyl-3-methylimidazolium tetrafluoroborate (EMIM BF4) and EMIM PF6).

In some embodiments of the energy storage device 5, the organic solvents used the hybrid electrolyte (not shown) or organic electrolyte (not shown) are selected from one or more of the group consisting of acetonitrile (ACN), propylene carbonate (PC), benzonitrile, succinonitrile, glutaronitrile, ethylene carbonate (EC), ethyl methyl carbonate (EMC), dimethyl carbonate (DMC), diethyl carbonate (DEC), methyl acetate, y-butyrolactone, tetrahydrofuran, N,N-dimethylformamide (DMF), dimethyl sulfoxide (DMSO), ethylene glycol (EG), glycerol, pyridine, sulfolane, acetamide, dimethyl ketone, 1,2-dimethoxyethane (DME), 1,3-dioxolane (DOL) and the like. In the preferred embodiment of the energy storage device 5, the organic solvent used is ACN.

In some embodiments of the energy storage device 5, the electrolyte (not shown) is a super-concentrated aqueous electrolyte. In some embodiments of the energy storage device 5, the super-concentrated aqueous electrolyte (not shown) comprises at least one metal salt in water with a molal concentration between 10 m and 100 m. In some embodiments of the energy storage device 5, the super-concentrated aqueous electrolyte (not shown) is a water-in-salt or water-in-bisalt electrolyte.

In some embodiments of the energy storage device 5, one or more salts used in the hybrid electrolyte (not shown) or super-concentrated aqueous electrolyte (not shown) are selected from the group consisting of Li bis(trifluoromethanesulfonyl)imide (LiTFSI), Li bis(fluorosulfonyl)imide (LiFSI), Li bis(pentafluoroethanesulfonyl)imide (LiBETI), Li 4,5-dicyano-2-trifluoromethanoimidazole (LiDCMI), Li [fluoro(nonafluorobutane) sulfonyl]imide (LiFNF), Li trifluoromethane sulfonate (LiOTf), NaTFSI, NaFSI, NaBETI, NaDCMI, NaFNF, NaOTf, KTFSI, KFSI, KBETI, KDCMI, KFNF, KOTf, Al(TFSI)3, Al(FSI)3, Al(BETI)3, Al(DCMI)3, Al(FNF)3 and Al(OTf)3, Zn(TFSI)2, Zn(BETI)2, and Zn(Otf)2. In some embodiments of the energy storage device 5, the metal cation is selected from one or more of the group consisting of Li+, Na+, K+, Cs+, Zn2+, Mg2+, Al3+, Ca2+, Sb3+, and Fe2+. In some embodiments of the energy storage device 5, the salt (not shown) comprises an anion selected from one or both of tetrafluoroborate (BF4) and hexafluorophosphate (PF6).

Figure 2:
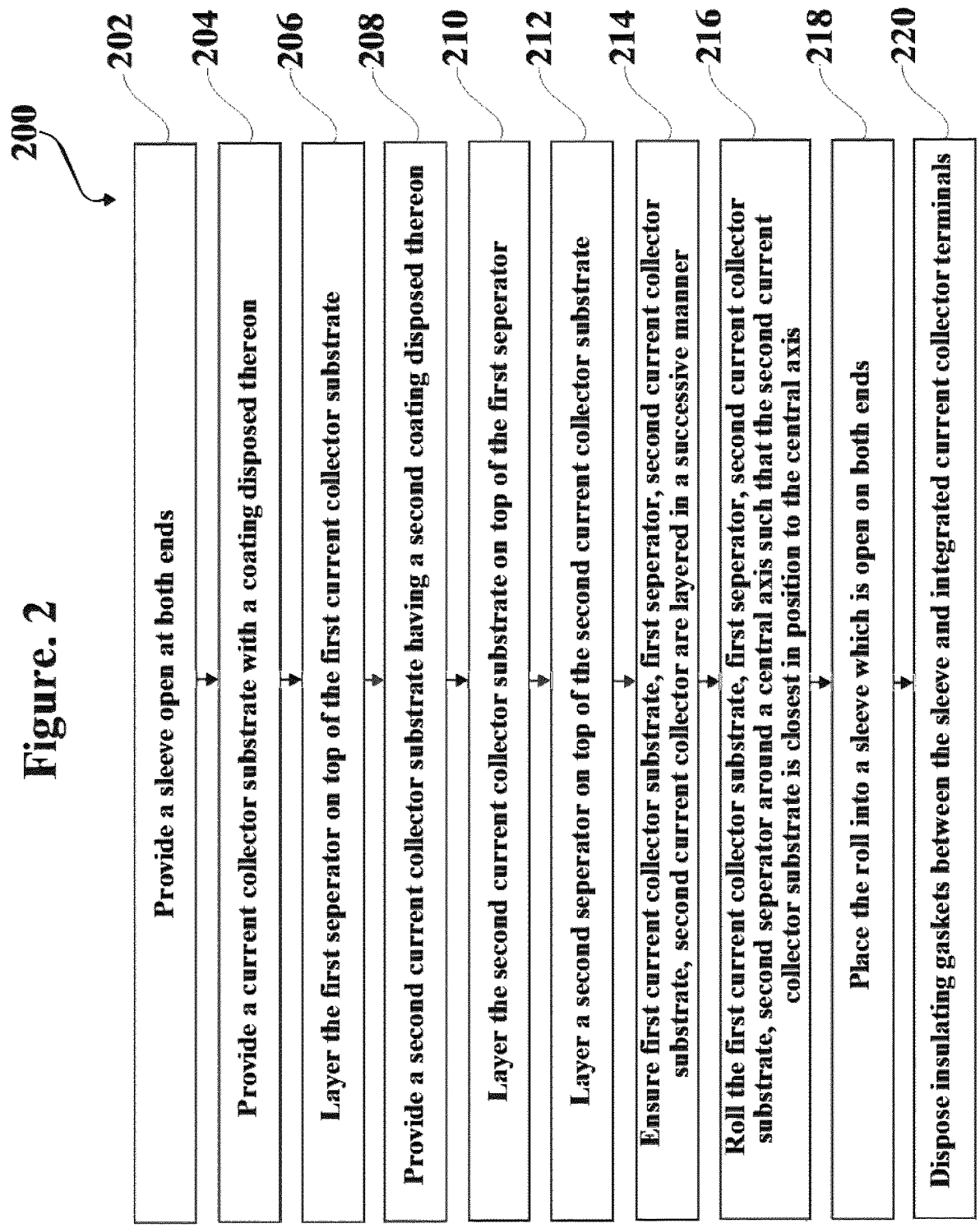
FIG. 2 is a block diagram comprising describing the steps for assembling the device.

FIG. 2 is a block diagram comprising describing the steps for assembling the energy storage device 5. This block diagram depicts a method to produce an energy storage device 200. This includes step 202 which is to provide a sleeve open at both ends. Provide a current collector substrate with a coating disposed thereon 204. In certain embodiments the current collector substrates have a coating disposed, or affixed, on both the upper and lower surfaces or sides. Layer the first separator on top of the first current collector substrate 206. Provide a second current collector substrate having a second coating disposed thereon 208. Layer the current collector substrate on top of the first separator 210. Layer a second separator on top of the second current collector substrate number 212. Ensure the first current collector substrate, first separator, second current collector substrate, second current collector are layered in a successive manner 214. Roll the first current collector substrate, first separator, second current collector substrate, second separator around the central axis such that the second current collector substrate is closest imposition to the central axes 216. Place the jellyroll into a sleeve which is open at both ends 218. Dispose insulating gaskets between the sleeve and the end caps integrated with current collector terminals 220.

Figure 3:
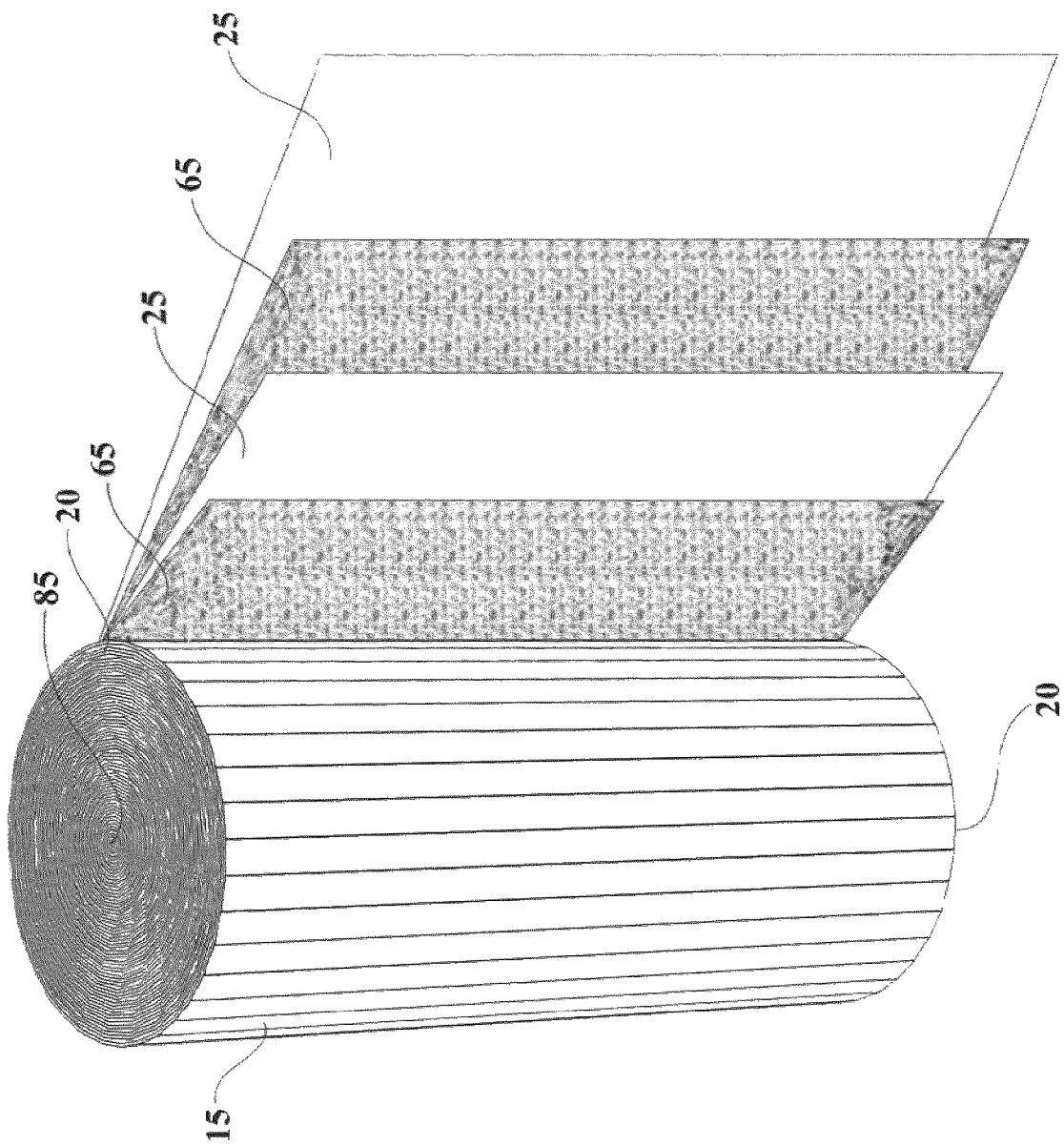
FIG. 3 shows a front view of an exemplified embodiment of the invention.

FIG. 3 shows a front view of an exemplified embodiment of the invention. In this nonlimiting example the jellyroll 15 is composed of two separators 25, 25, an electrode 65 composed of a first base material coated on both sides with electrode materials, a second electrode 65 composed of a first base material coated on both sides with electrode materials. The layering in this non-limiting example is as follows electrode 65, separator 25, electrode 65, separator 25, which is then rolled around a central axis 85 wherein the cathode forms the upper current collector surface 20 in the anode forms the lower current collector surface 20.

Figure 4:
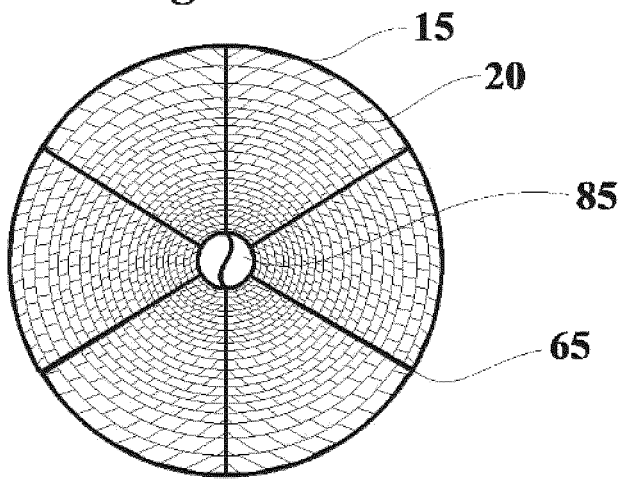
FIG. 4 is an exemplified embodiment showing a top view of the upper or lower portion of the jellyroll depicting the folding of the current collector of the cell resulting in a tabless cell.

FIG. 4 is an exemplified embodiment showing a top view of the folded portions of either the anode 65 or cathode 65, which form the current collector surface 20 of the jellyroll 15, which has been rolled about a central axis 85. In certain nonlimiting embodiments the figure is depicting the folded current collectors 20 of the jellyroll 15 portion of the cell resulting in a tabless cell. In certain nonlimiting embodiments the figure is depicting the folded current collectors 20 of the jellyroll 15 portion of the cell resulting in a folded tabbed cell. In certain nonlimiting embodiments the figure is depicting the folded current collectors 20 of the jellyroll 15 portion of the cell resulting in the anode being the upper or lower portion of the jellyroll 15, and the cathode being the opposing upper or lower portion of the jellyroll 15. In certain nonlimiting embodiments the figure is depicting the current collectors 20 of the jellyroll 15 portion of the cell resulting in the anode being the upper or lower portion of the jellyroll 15, and the cathode being located on the same upper or lower portion of the jellyroll 15 as the anode, which in additional embodiments may be accomplished by means of specific cutting and or arranging of the anode or cathode.

Figure 5A:
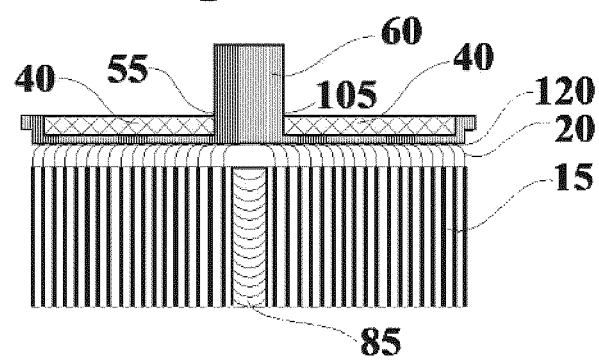
FIG. 5a showing the connection welding points for the current collectors of the jellyroll and the end cap integrated with the current terminal including the sealing washer.
Figure 5B:
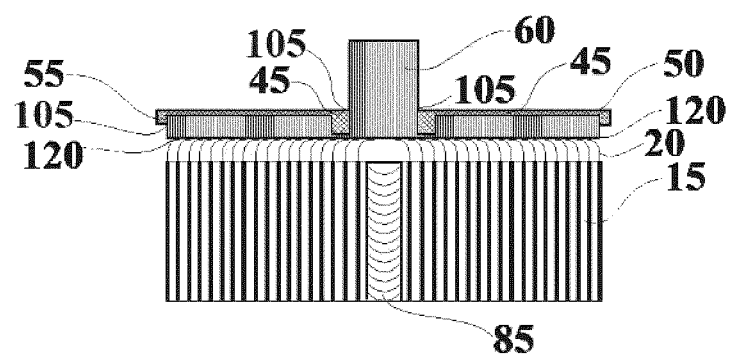
FIG. 5b showing the connection welding points for the current collectors of the jellyroll and the end cap integrated with the current terminal including a sealing cap.

FIG. 5 is a cross sectional view of an exemplified embodiment showing the upper or lower components of the cell. FIG. 5a showing the connection welding points 120 for the current collectors 20 of the jellyroll 15 and the end cap integrated with the current terminal 55 including the sealing washer 40. This diagram also shows the welding points 105 around the terminal 60 and the welding connection 120 to the jellyroll's 15 current collector surface 20 and the central axes 85. FIG. 5b showing the connection welding points 120 for the current collectors 20 of the jellyroll 15 and the end cap integrated with the current terminal 55 including the sealing cap 45 and the sealing cap ridge 50. This diagram also shows the welding points 105 around the terminal 60 and the welding connections 120 to the jellyroll's 15 current collector surface 20 and the central axes 85.

Figure 6A:
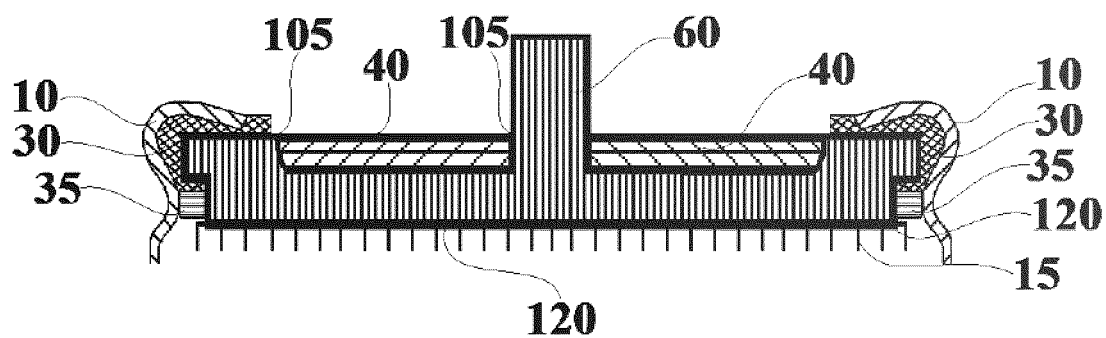
FIG. 6 is an exemplified embodiment showing a side view of the upper or lower portion of an end cap integrated with a current terminal and the design of the connected electrically isolated sleeve. 6a shows the connection welding points for the current collectors of the jellyroll and the end cap integrated with the current terminal including the sealing washer. It also includes the isolating gasket and ring that isolate the sleeve and the bending of the sleeve resulting in a hermetic seal. 6b shows the connection welding points for the current collectors of the jellyroll and the end cap integrated with the current terminal including sealing cap. It also includes the isolating gasket and ring that isolate the sleeve and depicts the bending of the sleeve resulting in a hermetic seal.
Figure 6B:
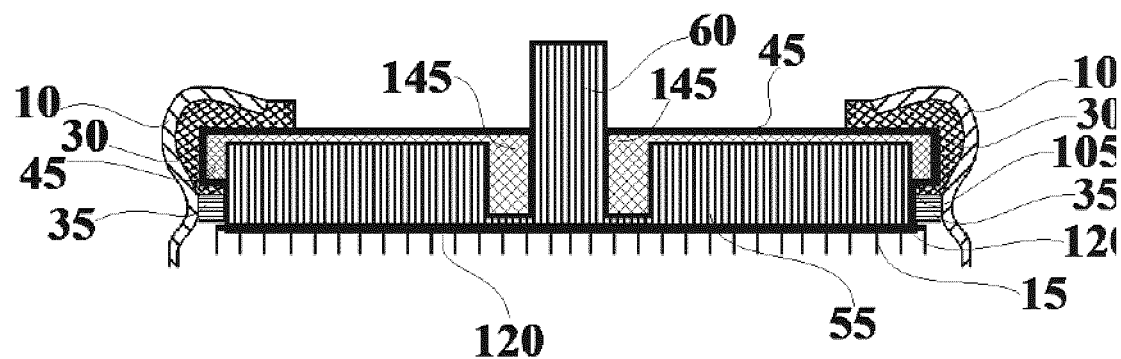

FIG. 6 is an exemplified embodiment showing a side view of the upper or lower portion of the end cap integrated with the current terminal 55 and the design of the electrically isolated sleeve 10. FIG. 6a shows the connection welding points 120 for the current collectors 20 of the jellyroll 15 and the end cap integrated with the current terminal end cap integrated with the current terminal 55 including the sealing washer 40, this embodiment also shows a weld 105 around the terminal 60 connecting it to the sealing washer 40 and another weld 105 around the sealing washer 40 connecting it to the end cap integrated with the current terminal 55. It also includes the isolating gasket 30 and sealing ring 35 that isolate the sleeve 10 and the bending of the sleeve 10 resulting in a hermetic seal. FIG. 6b shows the connection welding points 120 for the current collectors 20 of the jellyroll 15 and the end cap integrated with the current terminal 55 including the sealing cap 45, this embodiment also shows a weld 105 around the terminal 60 connecting it to the sealing cap 45 and another weld 105 around the sealing cap 45 connecting it to the end cap integrated with the current terminal 55. In this embodiment sealing 45 has a reinforcing wall 145 located on the inner portion of the ceiling 45 located adjacent to the terminal 60. It also includes the isolating gasket 30 and ring 35 that isolate the sleeve 10 and the bending of the sleeve 10 resulting in a hermetic seal.

Figure 8:
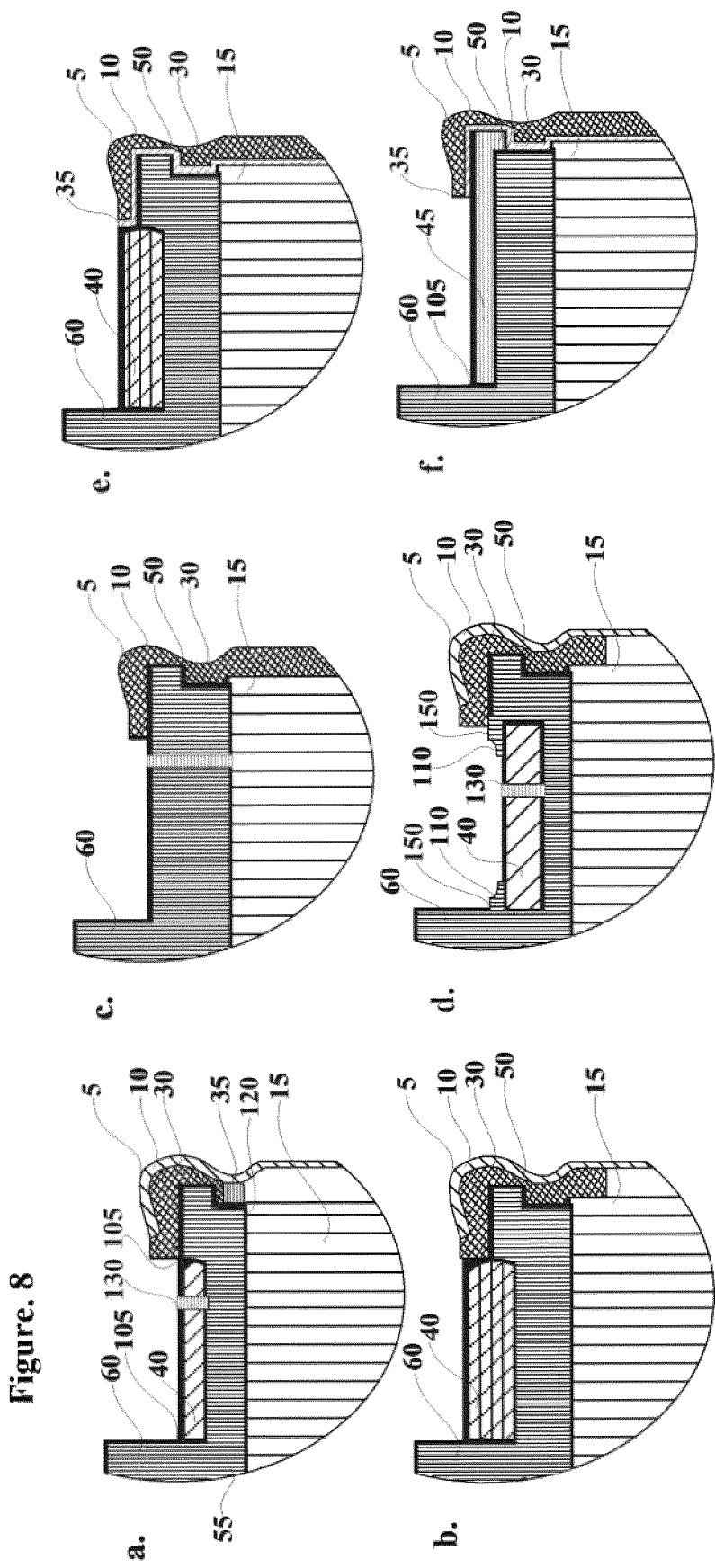
FIG. 8 show a cross section partial view of the energy storage device and 8a, 8b, 8c, 8d, 8e, 8f show different exemplified configurations of the components of the device for mechanical coupling, and to form a hermetic seal.

FIG. 7 is a side view of the electrically isolated sleeve 10 this includes the upper opening 95 and the lower opening 100. In this particular preferred embodiment, the sleeve 10 has a groove 90 on located at the upper opening 95 and another groove 90 located at the lower opening 100. FIG. 7b shows an embodiment of the sleeve 10 wherein no grooves have been pre-formed. In this exemplified embodiment the sleeve 10 has an upper opening end 95 and a lower opening 100 with the sleeve 10 having a uniform diameter. FIG. 7c shows an embodiment of the sleeve 10 wherein the cell sleeve is a multi-part assembly, which this figure depicts a two-part sleeve 10 assembly. In this embodiment the sleeve has an upper opening end 95 and a lower opening 100, and has a plurality of interconnection and or coupling points 150. Additionally, in this embodiment the sleeve 10 assembly forms the sealing gasket 30, which in alternative embodiments could include an additional compressible/noncompressible intermediary layer across the plain of one or a plurality of coupling points 150 to ensure a seal. Additionally, in certain embodiments the intermediary layer may include an additional binding material such as glue, epoxy, binder, or be directly bonded or fused to couple the sleeve 10 assembly components together, or be compression fitted, welded, or simply pressed together wherein the sleeve 10 assembly is designed with an interconnecting connection assembly. In additional embodiments the sleeve 10 assembly may include additional components or assemblies to form a sealed cell, these additional components may include non-limiting examples of compressible rings or gaskets 30, clasps, hinges, clamps, outer sleeve (not shown), or alternative means to press/fit the sleeve assembly together FIG. 8 show a cross section partial view of the energy storage device 5, it depicts different preferred and exemplified configurations of the energy storage device 5, and alternative components for forming the energy storage devices 5 hermetic seal. FIG. 8a is the preferred embodiment of the energy storage device 5. This embodiment the sealing washer 40 is connected to the end cap integrated with the current terminal 60 by means of welds 105 and 105. One welding connection 105 connects the protruding terminal 60 and the sealing washer 40, one additional welding connection 105 connects the sealing washer 40 to the end cap integrated with the current terminal 60 adjacent the upper outer edge. The electrically isolated sleeve 10 is formed around the gasket 30 and the sealing ring 35. Within the energy storage device 5 the jellyroll 15 is connected by means of the welding connection 120. In this preferred embodiment the sealing washer 40 additionally has on electrolyte filling port 130 for filling the electrolyte during manufacture. FIG. 8b is an exemplified embodiment of the energy storage device 5. This embodiment the sealing washer 40 is connected to the end cap integrated with the current terminal 60 by means of welds 105 and 105. One welding connection 105 connects the protruding terminal 60 and the sealing washer 40, one additional welding connection 105 connects the sealing washer 40 the end cap integrated with the current terminal 60 adjacent the upper outer edge. The electrically isolated sleeve 10 is formed around the gasket 30 and pressed about the sealing cap ridge 50. Within the energy storage device 5 the jellyroll 15 is connected by means of the welding connection 120. FIG. 8c is an exemplified embodiment of the energy storage device 5. This embodiment the sealing washer 40 is connected to the end cap integrated with the current terminal 60 by means of welds 105 and 105. One welding connection 105 connects the protruding terminal 60 and the sealing washer 40, one additional welding connection 105 connects the sealing washer 40 the end cap integrated with the current terminal 60 adjacent the upper outer edge. In this exemplified embodiment the electrically isolated sleeve 10, which in this non-limiting example is composed of an insulative or non-conductive material, is mechanically formed to seal the energy storage device 5 and may compose one or more of the gasket(s) 30 and or sealing ring(s) (not shown) which would allow a separate gasket(s) and or sealing ring(s) to be omitted from the cells components and assembly process, wherein it is pressed about the sealing cap ridge 50 to form a hermetic seal. Within the energy storage device 5 the jellyroll 15 is connected to the by means of the welding connection 120. FIG. 8d is an exemplified embodiment of the energy storage device 5. In this exemplified embodiment the end cap integrated with the current terminal 60 has protrusions 150 that extend over the upper portion of the sealing washer 40 to allow the sealing washer 40 to be crimped 110 and hermetically sealed to the terminal 60 and the inner edge of the end cap integrated with the current terminal 60 as an alternate assembly method to welding. The electrically isolated sleeve 10 is formed around the gasket 30 and the sealing ring 35 and formed into the end cap integrated with the current terminal ridge 50 to form a seal. Within the energy storage device 5 the jellyroll 15 is connected to the by means of the welding connection 120. In this exemplified embodiment the sealing washer 40 additionally has on electrolyte filling port 130 for filling the electrolyte during manufacture. FIG. 8e is an exemplified embodiment of the energy storage device 5. In this exemplified embodiment the end cap integrated with the current terminal 60 has a sealing washer 40 to allow the sealing, hermetically, to and around the terminal 60 and the inner outer edge of the end cap which may be accomplished by means of a number of different methods some non-limiting examples may include welding, crimping, pressing, bonding, gluing, or inserting to with or without expansion to form a seal. The electrically isolated sleeve 10 is forms the gasket 30 and the sealing intermediary layer 35, which in this embodiment runs the across the length, and or inner circumference, of the inside of the cell sleeve 10, and formed about the end cap integrated with the current terminal 60 to form a seal. It should be understood this intermediary layer 35 in certain embodiments may we disposed across the entire inside plain and interconnecting edges (not shown) and connecting points of the cell sleeve 10, across the plains of a plurality of assembly components of the cell sleeve 10, or a portion of the inner and edge plains of the cell sleeve 10 or cell sleeve assembly 10. In certain embodiments the intermediary layer 35 may be an insulator. In certain embodiments the intermediary layer 35 may be a separate component of the energy storage device 5 assembled during production. In certain embodiments the intermediary layer 35 may be directly connected or form a portion or all of the cell sleeve 10, which may be accomplished by a number of possible methods including non-limiting examples of spray deposition, bonding or gluing, or be part of the material comprising the cell sleeve 10. Within the energy storage device 5 the jellyroll 15 is connected to the by means of the welding connection (not shown). In this exemplified embodiment the sealing washer 40 is used to hermetically seal the energy storage device 5. FIG. 8f is an exemplified embodiment of the energy storage device 5. In this exemplified embodiment the end cap integrated with the current terminal 60 has a sealing cap 45 to allow the sealing, hermetically, to and around the terminal 60 and the outer edge of the end cap which may be accomplished by means of a number of different methods some non-limiting examples may include welding, crimping, pressing, bonding, gluing, to form a seal. The electrically isolated sleeve 10 forms the gasket 30 and has incorporated the sealing intermediary layer 35, which in this embodiment runs the across the length, and or inner circumference, of the inside of the cell sleeve 10, and formed about the end cap integrated with the current terminal 60 to form a seal. It should be understood that this intermediary layer 35 in certain embodiments may we disposed across the entire inside plain and interconnecting edges (not shown) and connecting points of the cell sleeve 10, across the plains of a plurality of assembly components of the cell sleeve 10, or a portion of the inner and edge plains of the cell sleeve 10 or cell sleeve assembly 10. In certain embodiments the intermediary layer 35 may be an insulator. In certain embodiments the intermediary layer 35 may be a separate component of the energy storage device 5 assembled during production. In certain embodiments the intermediary layer 35 may be directly connected or form a portion or all of the cell sleeve 10, which may be accomplished by a number of possible methods including non-limiting examples of spray deposition, bonding or gluing, or be part of the material comprising the cell sleeve 10. I Within the energy storage device 5 the jellyroll 15 is connected to the by means of the welding connection (not shown). In this exemplified embodiment the sealing cap 45 is used to hermetically seal the energy storage device 5 by means of welding 105.

FIG. 9 shows a preferred embodiment of the end cap integrated with the current terminal 55. FIG. 9a depicts a downward directed top view and shows the electrolyte filling ports 135, and the welding connection 120 used to connect the end cap integrated with the current terminal 55 to the jellyroll (not shown). FIG. 9b depicts a cross sectional side view, and shows the electrolyte filling ports 130, and the welding connection 120 used to connect the end cap integrated with the current terminal 55 to the jellyroll (not shown) and additionally shows the sealing groove 140 and sealing cap ridge 50, and additionally shows the protrusions 150 used to crimp the sealing washer within the sealing groove 140. FIG. 9c depicts a forward facing 45-degree angle directed view, and shows the electrolyte filling ports 135, and the welding connection 120 used to connect the end cap integrated with the current terminal 55 to the jellyroll (not shown) and additionally shows the protrusions 150 used to crimp the sealing washer within the sealing groove 140 (not shown) to the end cap integrated with the current terminal 55. FIG. 9a, 9b, 9c depict the electrolyte filling ports 135 as circular shaped holes, it should be noted that in alternative embodiments the electrolyte filling ports 135 could include a multitude of shapes. FIG. 9a, 9b, 9c depict the welding connections 120 as elongated oval shapes directed from the center of the end cap integrated with the current terminal 55 to the edge of the end cap integrated with the current terminal 55 uniformly spaced and arranged alternate to the electrolyte filling ports 135, it should be noted that in alternative embodiments the electrolyte welding connections 120 could include a multitude of shapes.

FIG. 10 shows a preferred embodiment of the end cap integrated with the current terminal 55. FIG. 10a depicts a downward directed top view, and shows the electrolyte filling ports 135, the sealing washer groove 140, and the welding connection 120 used to connect the end cap integrated with the current terminal 55 to the jellyroll (not shown). FIG. 10b depicts a cross sectional side view, and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 10c depicts a forward facing 45-degree angle directed view and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 10a, 10b, 10c depict the electrolyte filling ports 135 as elongated oval shapes directed from the center of the end cap integrated with the current terminal 55 to the edge of the end cap integrated with the current terminal 55 uniformly spaced, it should be noted that in alternative embodiments the electrolyte filling ports 135 could include a multitude of shapes. FIG. 10a, 10b, 10c depict the welding connections 120 as elongated oval shapes directed from the center of the end cap integrated with the current terminal 55 to the edge of the end cap integrated with the current terminal 55 uniformly spaced and arranged alternate to the electrolyte filling ports 135, it should be noted that in alternative embodiments the electrolyte welding connections 120 could include a multitude of shapes.

FIG. 11 shows a preferred embodiment of the end cap integrated with the current terminal 55. FIG. 11a depicts a downward directed top view, and shows the electrolyte filling ports 135, the sealing washer groove 140 and the welding connection 120 used to connect the end cap integrated with the current terminal 55 to the jellyroll (not shown). FIG. 11b depicts a cross sectional side view, and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 11c depicts a forward facing 45-degree angle directed view and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 11a, 11b, 11c depict the electrolyte filling ports 135 as circular shaped holes, it should be noted that in alternative embodiments the electrolyte filling ports 135 could include a multitude of shapes. FIG. 11a, 11b, 11c depict the welding connections 120 as circular shaped uniformly spaced and arranged alternate to the electrolyte filling ports 135, it should be noted that in alternative embodiments the electrolyte welding connections 120 could include a multitude of shapes.

FIG. 12 shows a preferred embodiment of the end cap integrated with the current terminal 55. FIG. 12a depicts a downward directed top view, and shows the electrolyte filling ports 135, the sealing washer groove 140, and the welding connection 120 used to connect the end cap integrated with the current terminal 55 to the jellyroll (not shown). FIG. 12b depicts a cross sectional side view, and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 12c depicts a forward facing 45-degree angle directed view and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 12a, 12b, 12c depict the electrolyte filling ports 135 as elongated oval shapes directed from the edge of the end cap integrated with the current terminal 55 to opposing edge of the end cap integrated with the current terminal 55 successive and uniformly spaced, it should be noted that in alternative embodiments the electrolyte filling ports 135 could include a multitude of shapes. FIG. 12a, 12b, 12c depict the welding connections 120 as elongated oval shapes directed from the edge of the end cap integrated with the current terminal 55 to the opposing edge of the end cap integrated with the current terminal 55 successive and uniformly spaced which are arranged alternate to the electrolyte filling ports 135, it should be noted that in alternative embodiments the electrolyte welding connections 120 could include a multitude of shapes.

FIG. 13 shows a preferred embodiment of the end cap integrated with the current terminal 55. FIG. 13a depicts a downward directed top view, and shows the electrolyte filling ports 135, the sealing washer groove 140, and the welding connection 120 used to connect the end cap integrated with the current terminal 55 to the jellyroll (not shown). FIG. 13b depicts a cross sectional side view, and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 13c depicts a forward facing 45-degree angle directed view and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 13a, 13b, 13c depict the electrolyte filling ports 135 as ring shaped slots with supporting members successively from the edge of end cap integrated with the current terminal 55 uniformly spaced, it should be noted that in alternative embodiments the electrolyte filling ports 135 could include a multitude of shapes, sizes and locations. FIG. 13a, 13b, 13c depict the welding connections 120 as ring shaped slots with supporting members successively from the edge of end cap integrated with the current terminal 55 uniformly spaced, it should be noted that in alternative embodiments the welding connections 120 could include a multitude of shapes, arrangements and locations which are arranged alternate to the electrolyte filling ports 135.

FIG. 14 shows a preferred embodiment of the end cap integrated with the current terminal 55. FIG. 14a depicts a downward directed top view and shows the electrolyte filling ports 135, and the welding connection 120 used to connect the end cap integrated with the current terminal 55 to the jellyroll (not shown). FIG. 14b depicts a cross sectional side view, and shows the electrolyte filling ports 135, and the welding connections 120 used to connect the end cap integrated with the current terminal 55 to the jellyroll (not shown) and additionally shows the terminal 60. FIG. 14c depicts a forward facing 45-degree angle directed view and shows the electrolyte filling ports 135, and the welding connections 120 used to connect the end cap integrated with the current terminal 55 to the jellyroll (not shown) and additionally shows the terminal 60. FIG. 14a, 14b, 14c depict the electrolyte filling ports 135 as circular shaped holes, it should be noted that in alternative embodiments the electrolyte filling ports 135 could include a multitude of shapes. FIG. 14a, 14b, 14c depict the welding connections 120 as elongated oval shapes directed from the center of the end cap integrated with the current terminal 55 to the edge of the end cap integrated with the current terminal 55 uniformly spaced and arranged alternate to the electrolyte filling ports 135, it should be noted that in alternative embodiments the welding connections 120 could include a multitude of shapes.

FIG. 15 shows a preferred embodiment of the end cap integrated with the current terminal 55. FIG. 15a depicts a downward directed top view and shows the electrolyte filling ports 135, and the welding connection 120 used to connect the end cap integrated with the current terminal 55 to the jellyroll (not shown). FIG. 15b depicts a cross sectional side view, and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 15c depicts a forward facing 45-degree angle directed view and shows the electrolyte filling ports 135, and the welding connections 120 used to connect the end cap integrated with the current terminal 55 to the jellyroll (not shown) and additionally shows the sealing groove 140 and sealing Ridge 50, the reinforcing wall 145 of the terminal 60. FIG. 15a, 15b, 15c depict the electrolyte filling ports 135 as circular shaped holes, it should be noted that in alternative embodiments the electrolyte filling ports 135 could include a multitude of shapes. FIG. 15*a*, 15*b*, 15*c* depict the welding connections 120 as circular shaped uniformly spaced and arranged alternate to the electrolyte filling ports 135, it should be noted that in alternative embodiments the electrolyte welding connections 120 could include a multitude of shapes.

FIG. 16 depicts a preferred embodiment of the sealing cap 45. FIG. 16*a* depicts a downward directed top view of the sealing cap 45. The sealing cap 45 comprises a electrolyte filling port 130, sealing cap ridge 50 and the terminal through hole 125. FIG. 16*b* depicts a cross sectional side view of the sealing cap 45. The sealing cap 45 comprises a electrolyte filling port 130, sealing cap ridge 50 and the terminal through hole 125. FIG. 16*c* depicts a forward facing 45-degree angle directed view of the sealing cap 45. The sealing cap 45 comprises a electrolyte filling port 130, sealing cap ridge 50 and the terminal through hole 125.

FIG. 17 depicts a preferred embodiment of the sealing cap 45. FIG. 17*a* depicts a downward directed top view of the sealing cap 45. The sealing cap 45 comprises a electrolyte filling port 130, sealing cap ridge 50 and the terminal through hole 125 with reinforcing wall 145. FIG. 17*b* depicts a cross sectional side view of the sealing cap 45. The sealing cap 45 comprises a electrolyte filling port 130, sealing cap ridge 50 and the terminal through hole 125 with reinforcing wall 145. FIG. 17*c* depicts a forward facing 45-degree angle directed view of the sealing cap 45. The sealing cap 45 comprises a electrolyte filling port 130, sealing cap ridge 50 and the terminal through hole 125 with reinforcing wall 145.

FIG. 18 depicts an exemplified embodiment of the sealing washer 40 which may also be a disk, insert, covering, or alternative design or designation with means to seal or close a proportion of the end cap integrated with the current terminal. FIG. 18*a* depicts a downward directed top view of the sealing washer 40. The sealing washer 40 comprises the terminal through hole 125. FIG. 18*b* depicts a cross sectional side view of the sealing washer 40. The sealing washer 40 comprises the terminal through hole 125. FIG. 18*c* depicts a forward facing 45-degree angle directed view of the sealing washer 40. The sealing washer 40 comprises the terminal through hole 125.

FIG. 19 depicts a preferred embodiment of the sealing washer 40. FIG. 19*a* depicts a downward directed top view of the sealing washer 40. The sealing washer 40 comprises the terminal through hole 125 and electrolyte filling port 130. FIG. 19*b* depicts a cross sectional side view of the sealing washer 40. The sealing washer 40 comprises the terminal through hole 125 and electrolyte filling port 130. FIG. 19*c* depicts a forward facing 45-degree angle directed view of the sealing washer 40. The sealing washer 40 comprises the terminal through hole 125 and electrolyte filling port 130.

What is claimed is:

1. An energy storage device, comprising:
    an energy-storage member defining a first current collector at a first end thereof and a second current collector at a second end that is opposite the first end;
    a first end cap electrically connected to the first current collector;
    a second end cap electrically connected to the second current collector; and
    an open-ended sleeve dimensioned complementarily to the energy-storage member and receiving the energy-storage member such that the first and second ends face opposite open ends of the sleeve, the sleeve being structurally coupled to the first and second end caps such that the sleeve is electrically isolated from the energy-storage member, the first end cap, and the second end cap;
    wherein the first end cap has one or more electrolyte openings formed therein suitable for receiving electrolyte into the sleeve, the energy storage device further comprising:
        the electrolyte disposed in the sleeve such that the electrolyte substantially permeates the energy-storage member;
        a first plate integrally coupled to the first end cap for sealing the one or more electrolyte openings; and
        at least one insulator positioned between the energy-storage member and the sleeve to electrically isolate the energy-storage member from the sleeve,
    wherein the first plate extends across the first end cap to form an overhang extending over a circumferential edge of the first end cap, the at least one insulator being positioned at least partially over the overhang, the at least one insulator being sandwiched between the sleeve and the overhang so as to maintain the sleeve in electrical isolation from the energy-storage member.

2. The energy storage device of claim 1, wherein a first insulator of the at least one insulator circumscribes the energy-storage member at the first end and contacts the sleeve adjacent the first end cap, a second insulator of the at least one insulator separate from the first insulator circumscribes the energy-storage member at the second end and contacts the sleeve adjacent the second end cap, a first circumferential edge of the sleeve being proximal to the first end cap, the first insulator being sandwiched between the sleeve and the first end cap, a second circumferential edge of the sleeve being proximal to the second end cap, the second insulator being sandwiched between the sleeve and the second end cap.

3. The energy storage device of claim 1, wherein:
    the at least one insulator extends circumferentially around the energy-storage member at the first and second ends and contacts the sleeve at the opposite open ends of the sleeve, the first and second end caps defining first and second terminals projecting therefrom, respectively;
    the first plate has a first aperture therethrough dimensioned for receiving the first terminal; and
    the energy storage device further comprises a second plate extending across the second end cap and having a second-plate aperture therethrough dimensioned for receiving the second terminal;
    wherein the at least one insulator is sandwiched between the sleeve and the second plate.

4. The energy storage device of claim 1, wherein the sleeve and the at least one insulator are in unitary construction.

5. The energy storage device of claim 1, wherein the first end cap is welded to the first current collector at a first welding channel formed in the first end cap, the second end cap being welded to the second current collector at a second welding channel formed in the second end cap.

6. The energy storage device of claim 1, wherein the opposite open ends of the sleeve are substantially equal-sized, the first and second end caps being substantially equal-sized to complement the opposite open ends of the sleeve.

7. The energy storage device of claim 6 wherein the sleeve is cylindrical and the energy-storage member comprises a roll defined by a first electrode assembly, a second electrode assembly, a first separator, and a second separator being rolled together such that the first electrode assembly is sandwiched between the first and second separators, and the second separator is sandwiched between the first and second electrode assemblies.

8. The energy storage device of claim 1, wherein the electrolyte is a hybrid electrolyte.

9. The energy storage device of claim 8, wherein the hybrid electrolyte comprises at least one salt in a mixture of water and at least one non-aqueous solvent, the molal concentration of the at least one salt in the mixture being between 3.5 m and 12 m.

10. The energy storage device of claim 1, wherein the electrolyte is a super-concentrated aqueous electrolyte.

11. The energy storage device of claim 10, wherein the super-concentrated aqueous electrolyte comprises at least one salt in water at a molal concentration between 7 m and 100 m.

12. The energy storage device of claim 1, wherein the first current collector includes an electrode substrate composed of a material including at least one of aluminium, copper, titanium, nickel, stainless steel, a metal-based alloy, a carbonous material, graphite, or carbon cloth.

* * * * *